(12) United States Patent
Lutz

(10) Patent No.: US 7,752,940 B2
(45) Date of Patent: Jul. 13, 2010

(54) ADJUSTABLE STEERING COLUMN FOR A MOTOR VEHICLE

(75) Inventor: Christian Lutz, Nüziders (AT)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 168 days.

(21) Appl. No.: 12/068,100

(22) Filed: Feb. 1, 2008

(65) Prior Publication Data
US 2008/0178702 A1 Jul. 31, 2008

Related U.S. Application Data

(63) Continuation of application No. PCT/AT2006/000315, filed on Jul. 26, 2006.

(30) Foreign Application Priority Data

Aug. 1, 2005 (DE) ........................ 10 2005 036 582

(51) Int. Cl.
*B62D 1/18* (2006.01)
(52) U.S. Cl. ........................ 74/493; 280/775
(58) Field of Classification Search ................... 74/493; 280/775, 777
See application file for complete search history.

(56) References Cited

U.S. PATENT DOCUMENTS

| | | | |
|---|---|---|---|
| 5,743,150 | A | 4/1998 | Fevre et al. |
| 5,787,759 | A | 8/1998 | Olgren |
| 5,893,676 | A | 4/1999 | Yamamoto et al. |
| 5,988,679 | A | 11/1999 | Schelling et al. |
| 6,092,957 | A | 7/2000 | Fevre et al. |
| 6,095,012 | A | 8/2000 | Lutz |
| 6,581,965 | B2 | 6/2003 | Lutz |
| 2002/0011725 | A1 | 1/2002 | Lutz |

(Continued)

FOREIGN PATENT DOCUMENTS

DE 195 14 741 12/1995

(Continued)

OTHER PUBLICATIONS

International Search Report issued Nov. 21, 2006 in the International (PCT) Application No. PCT/AT2006/000315.

*Primary Examiner*—Thomas R Hannon
*Assistant Examiner*—Justin Krause
(74) *Attorney, Agent, or Firm*—Wenderoth, Lind & Ponack, L.L.P.

(57) ABSTRACT

An adjustable steering column for a motor vehicle includes a fixing device, in the opened state of which the steering column is adjustable in at least one displacement direction, and, in the closed state of which the set position of the steering column is fixed in the displacement direction or at least one of the displacement directions, for fixing the set position comprises at least one securement part which includes at least one toothing with teeth, and at least one counter-securement part, which includes at least one counter toothing, with teeth. Viewed in a cross section through the teeth of the securement part and of the counter-securement part, wherein the plane of this cross section is oriented parallel to the displacement direction and parallel to the opening direction, both side flanks of the teeth of the securement part and of the counter-securement part in the closed state of the fixing device form, at least in a section of their extent, inclination angles of less than 20°, preferably less than 12°, with the opening direction.

23 Claims, 15 Drawing Sheets

U.S. PATENT DOCUMENTS

| | | | |
|---|---|---|---|
| 2004/0261565 A1* | 12/2004 | Uphaus et al. | 74/493 |
| 2005/0016315 A1* | 1/2005 | Breuss et al. | 74/493 |
| 2008/0047385 A1* | 2/2008 | Oh | 74/493 |
| 2008/0178702 A1* | 7/2008 | Lutz | 74/493 |
| 2009/0044656 A1* | 2/2009 | Okada et al. | 74/493 |

FOREIGN PATENT DOCUMENTS

| | | |
|---|---|---|
| DE | 198 05 289 | 8/1998 |
| DE | 198 39 496 | 3/2000 |
| DE | 100 31 721 | 12/2000 |
| DE | 101 30 587 | 1/2002 |
| DE | 698 10 553 | 10/2003 |
| EP | 0 796 780 | 9/1997 |
| EP | 0 836 981 | 12/1999 |
| EP | 0 755 842 | 3/2000 |
| EP | 0 802 104 | 10/2006 |
| FR | 2 810 956 | 1/2002 |
| GB | 2 290 126 | 12/1995 |

* cited by examiner

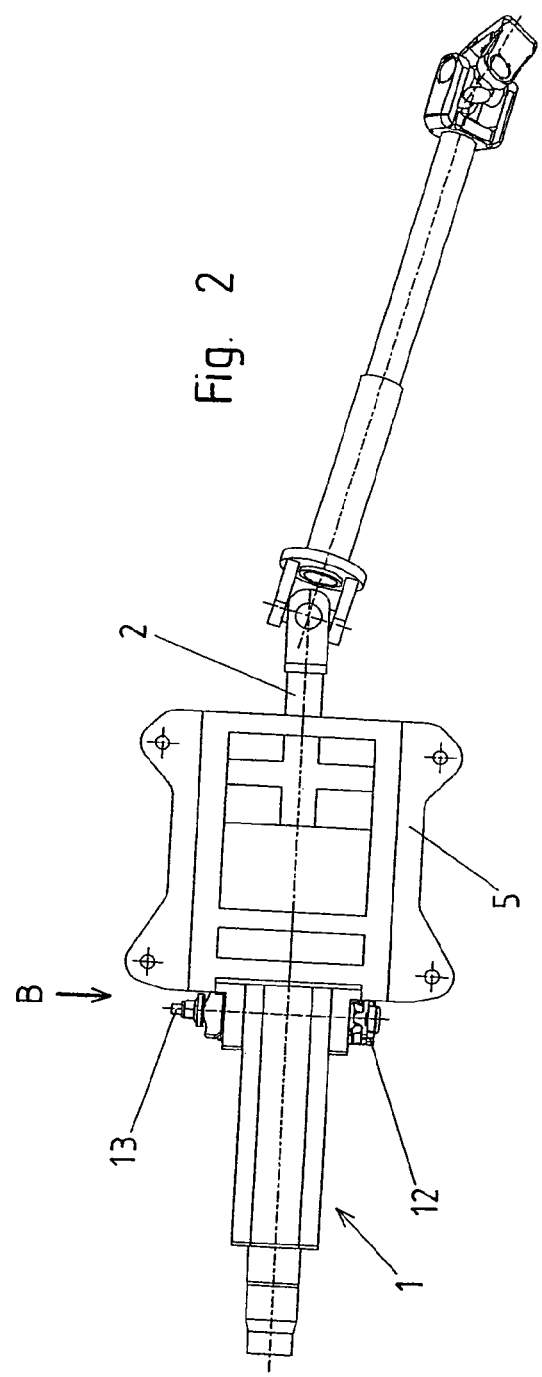
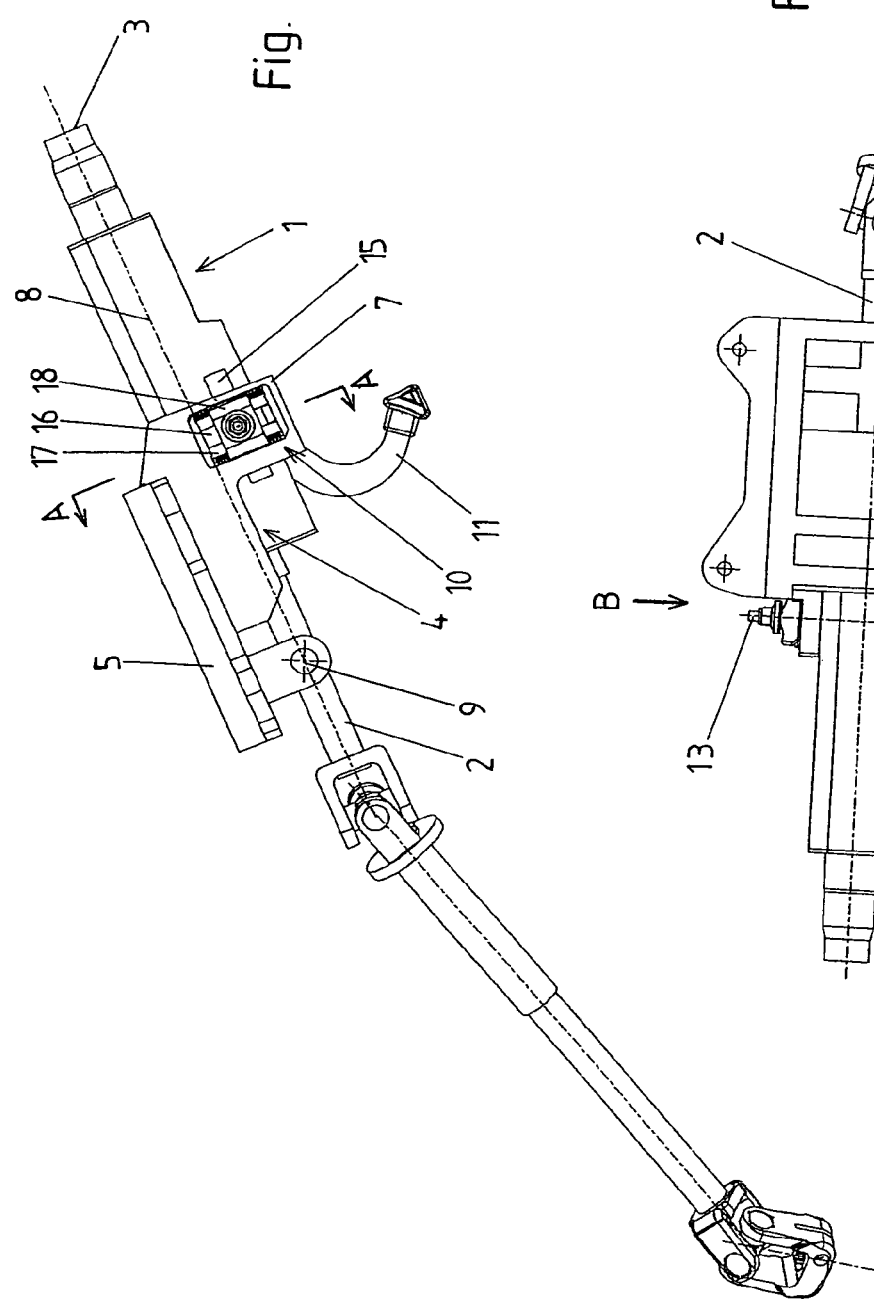

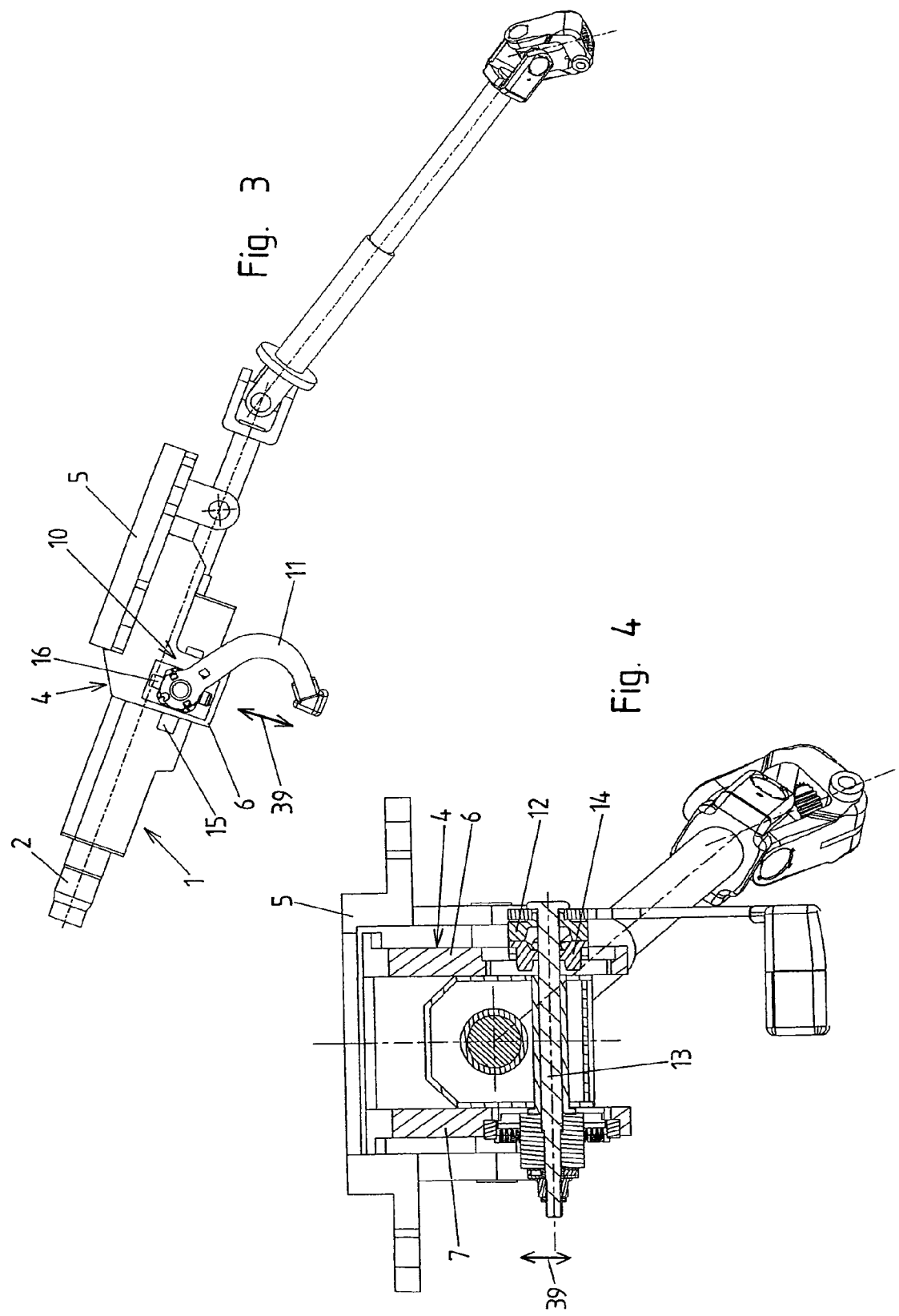

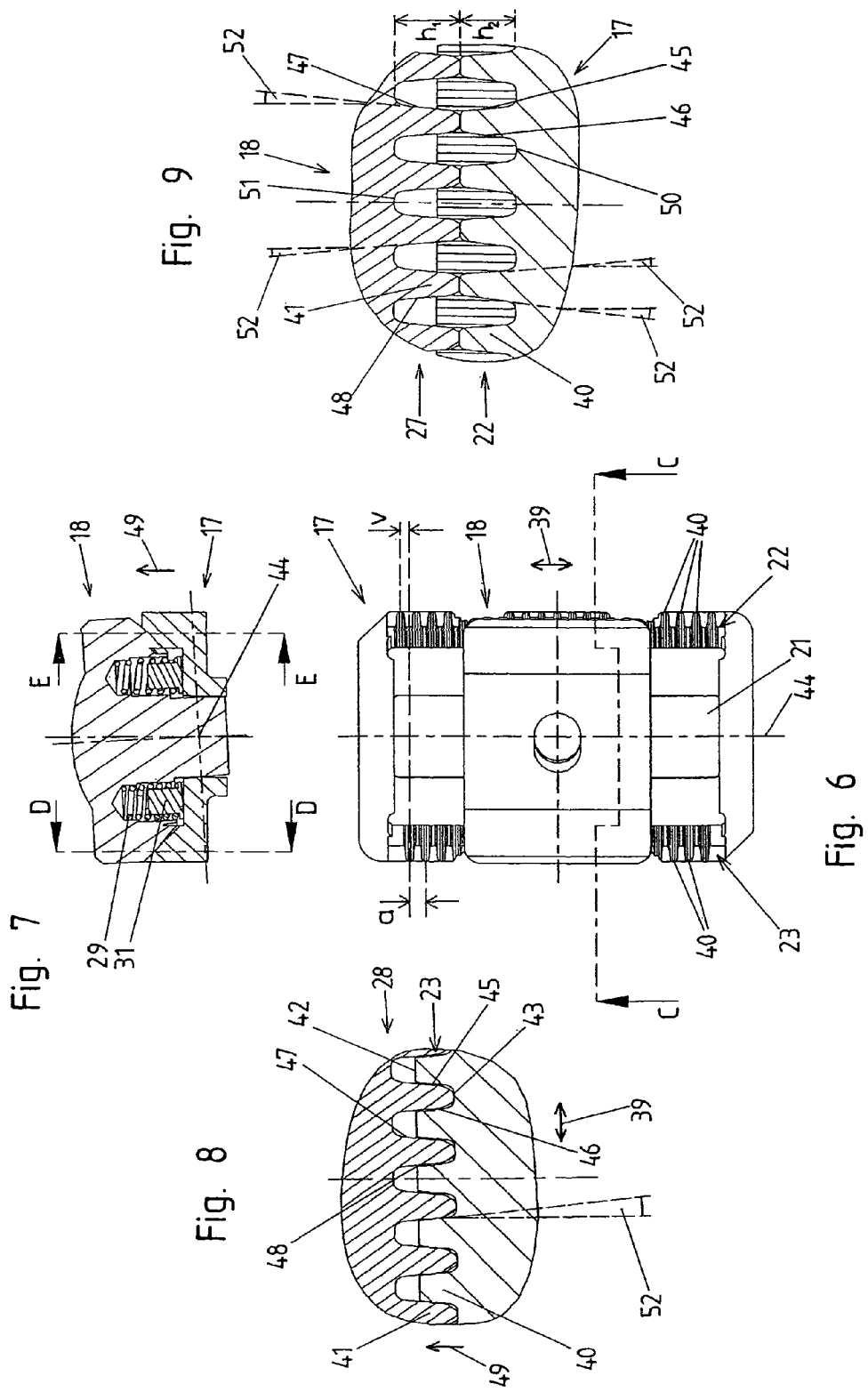

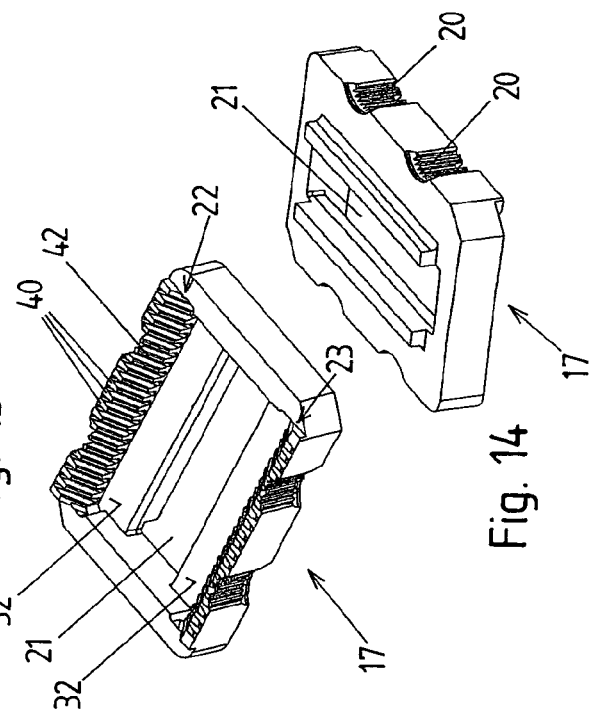
Fig. 10
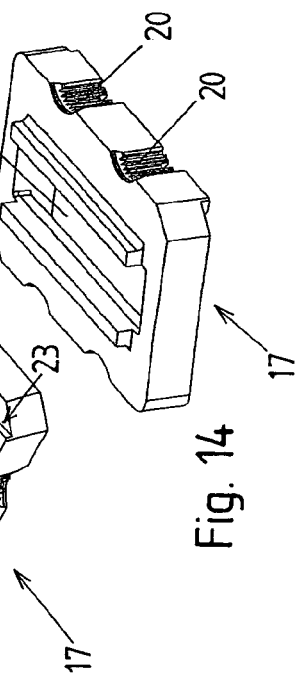
Fig. 13
Fig. 14
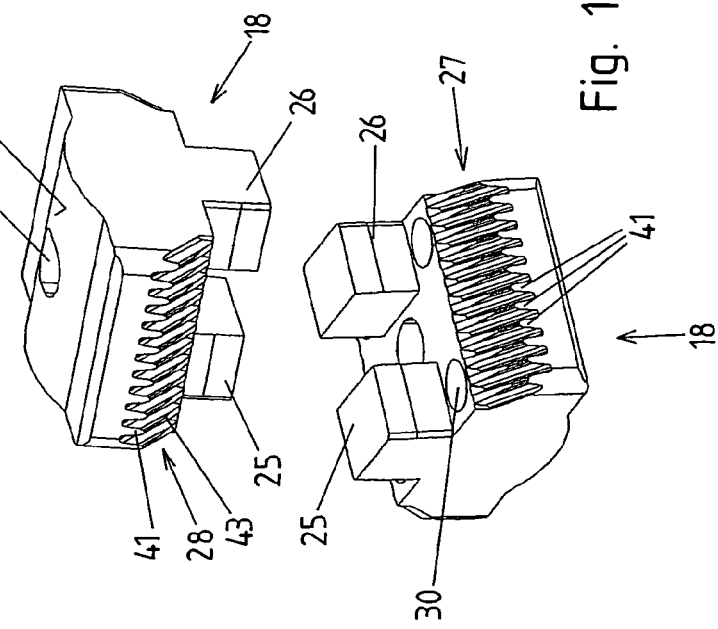
Fig. 11
Fig. 12

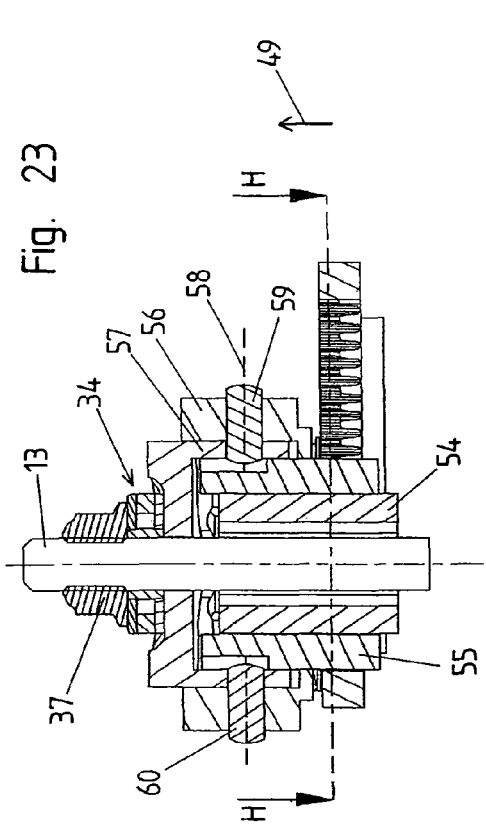
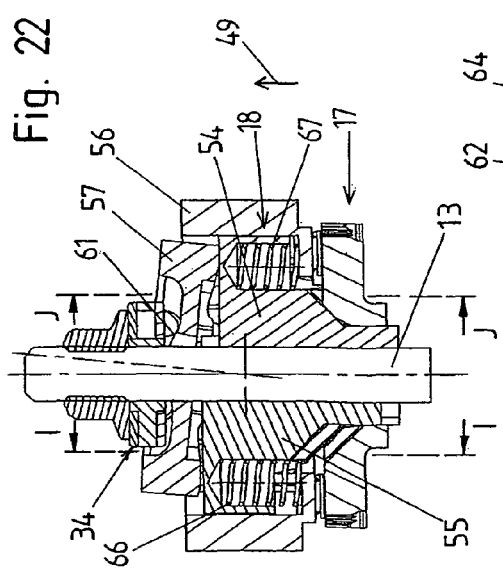
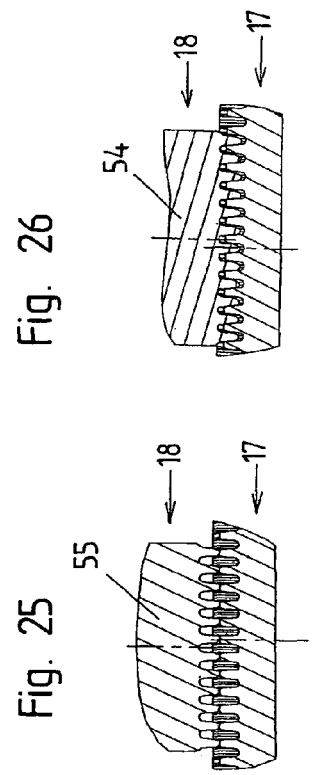
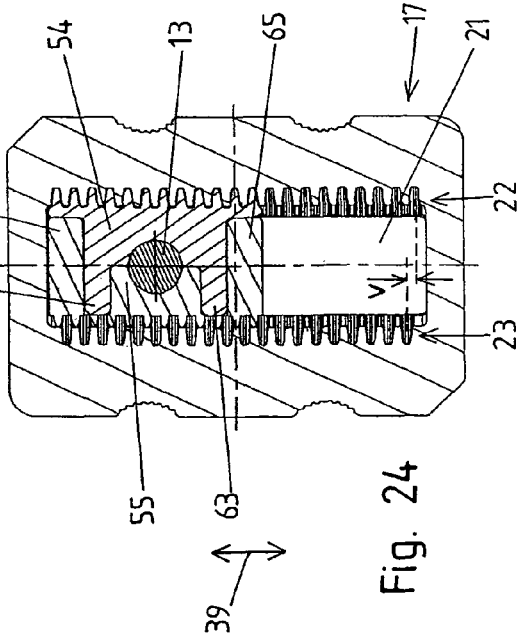

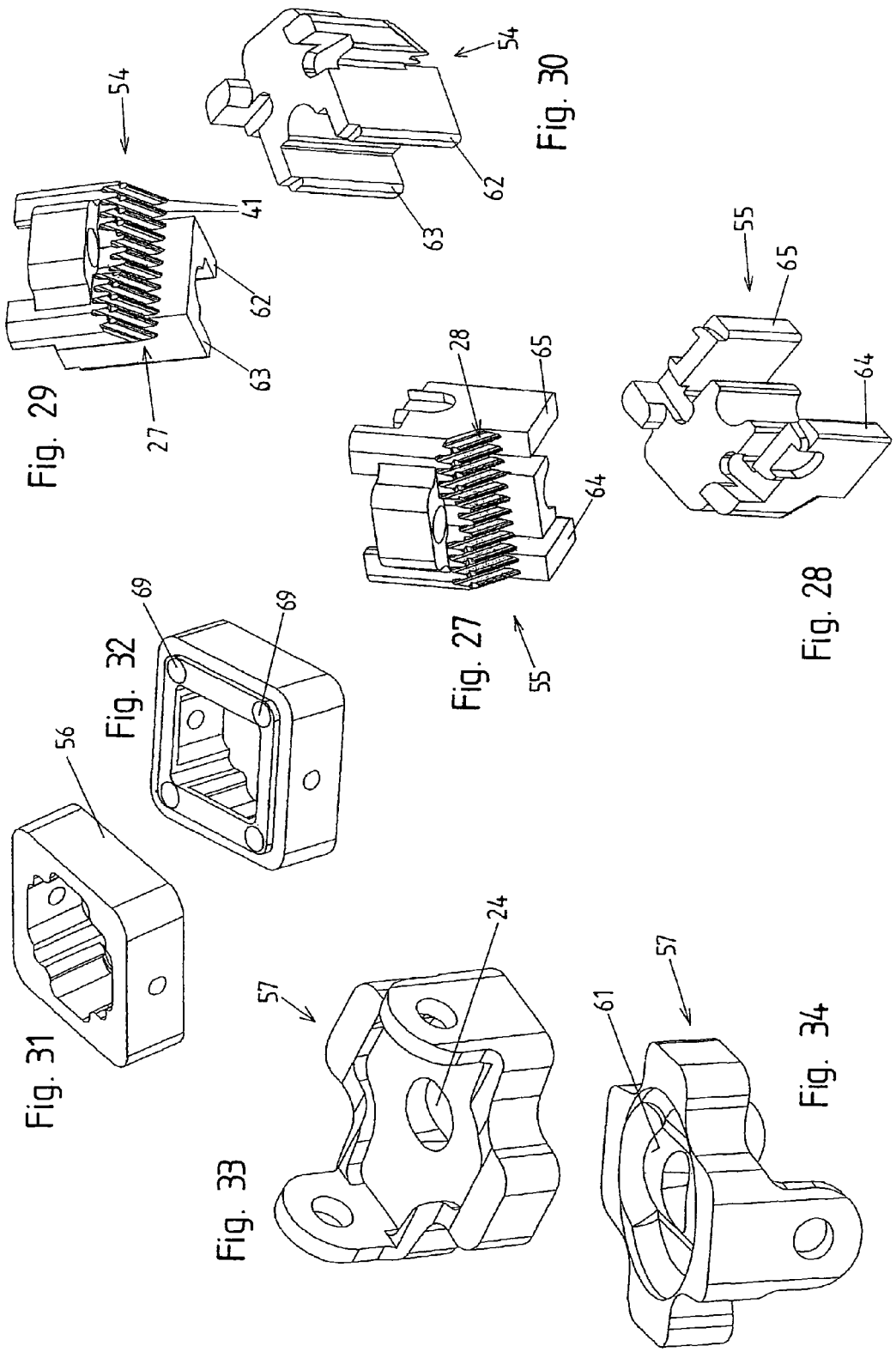

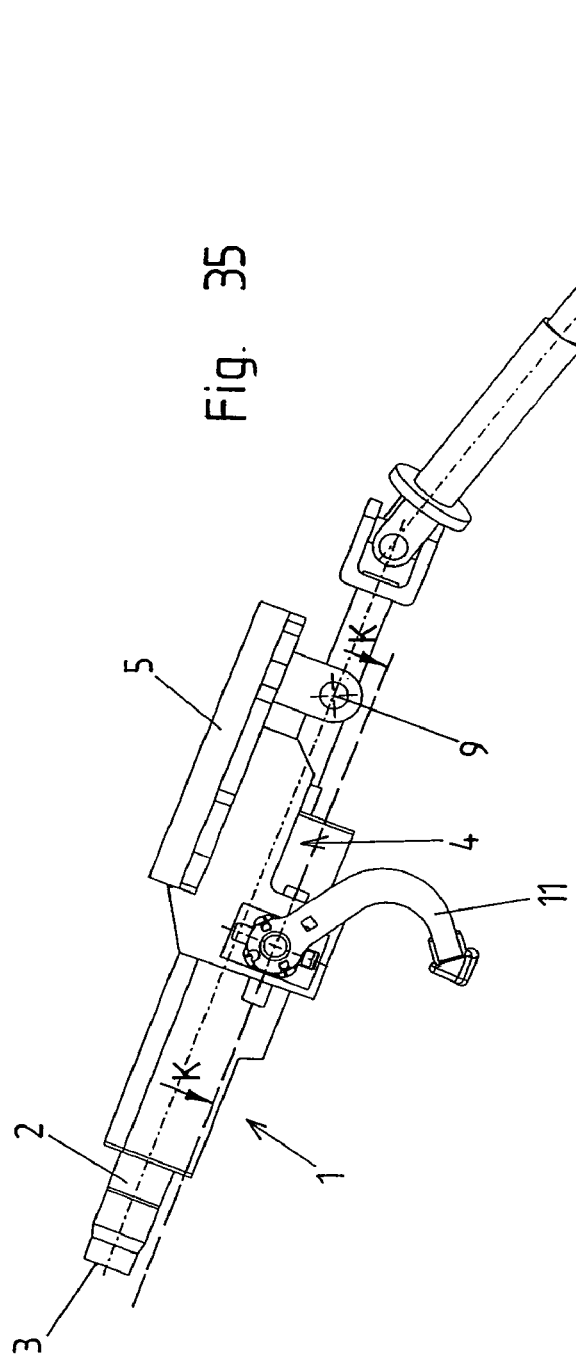
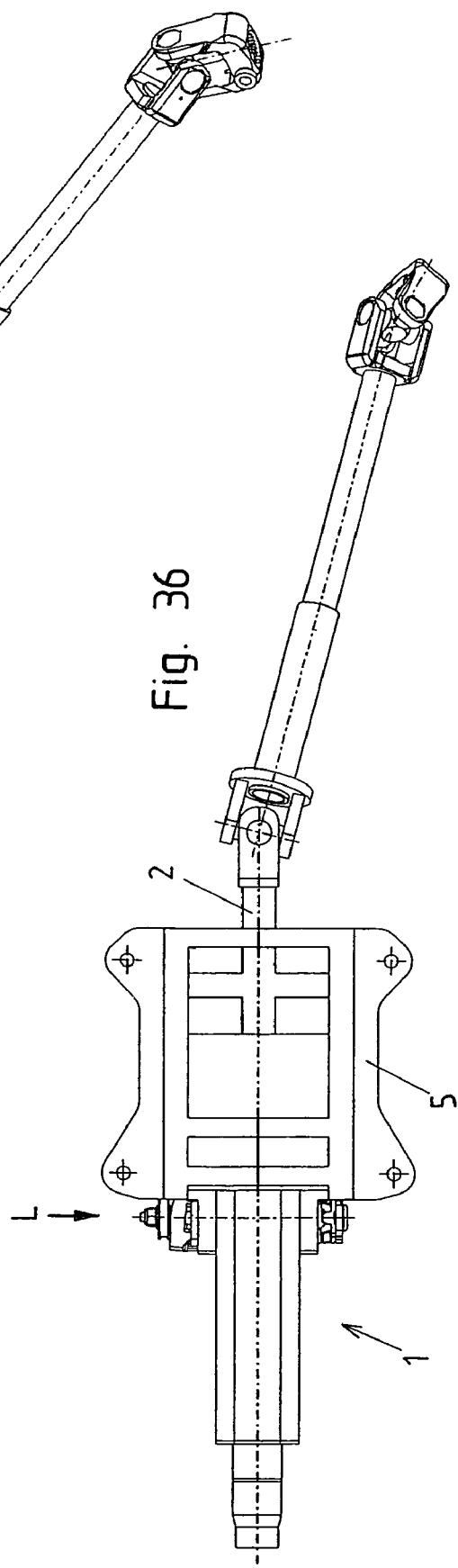

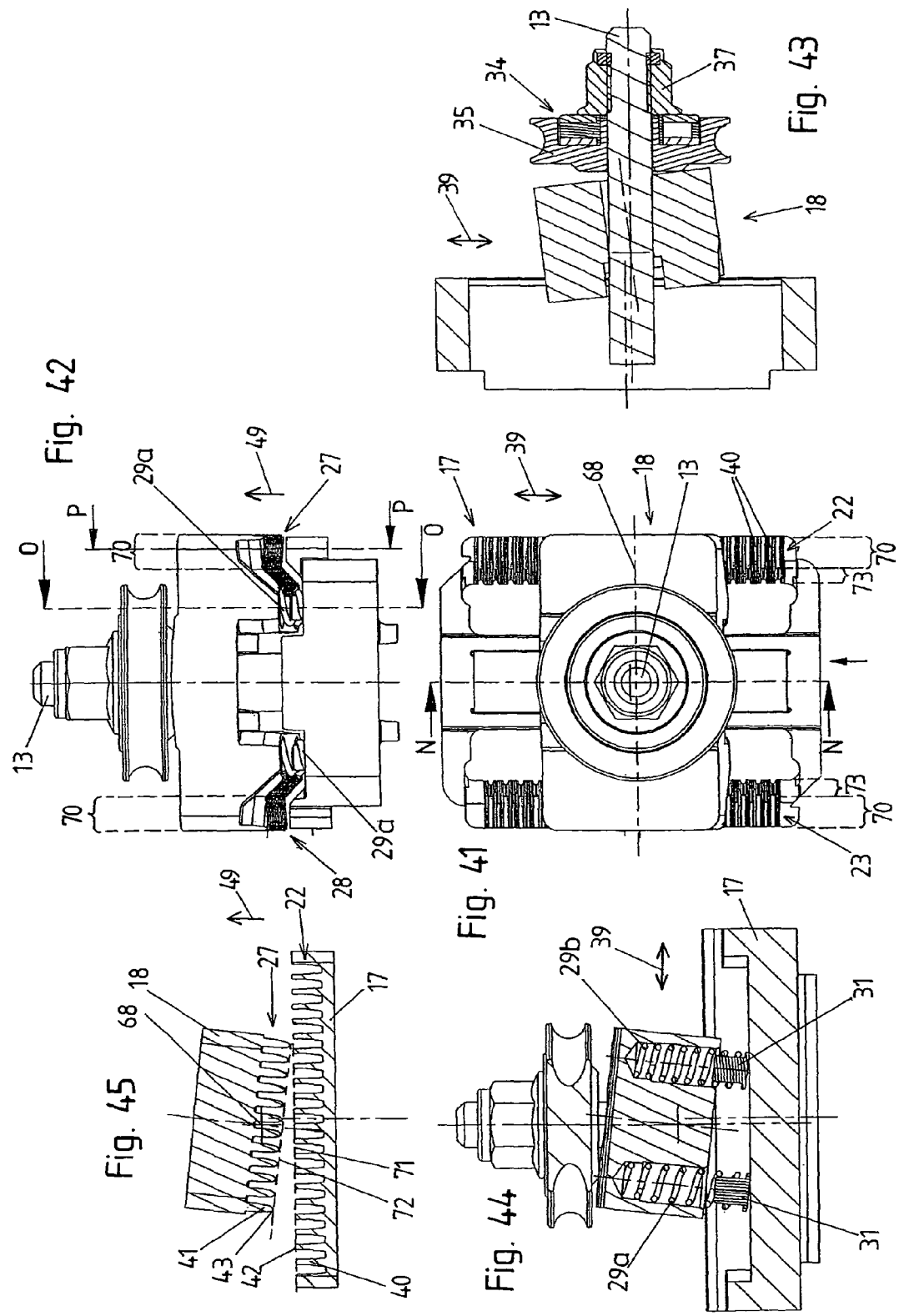

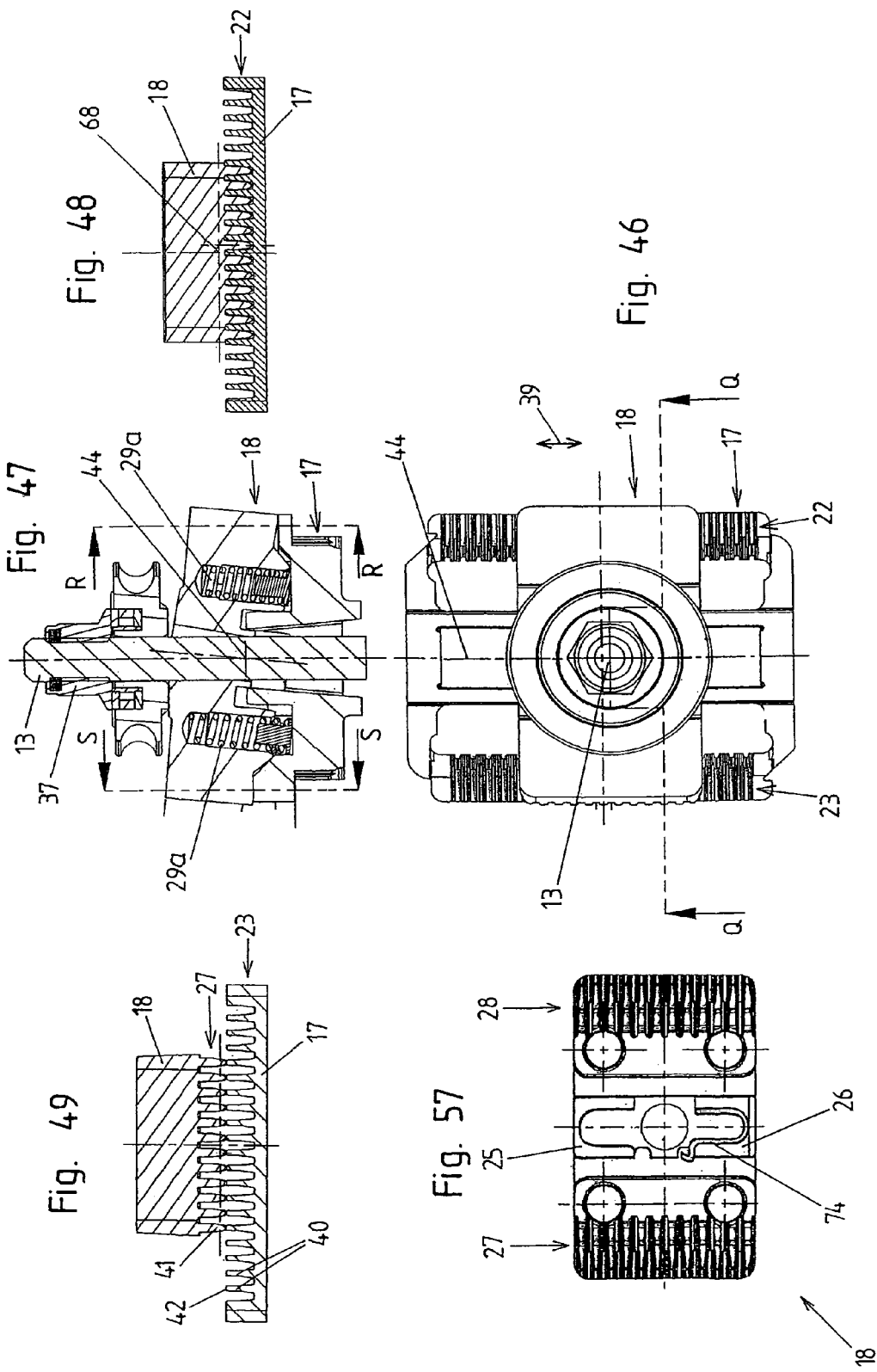

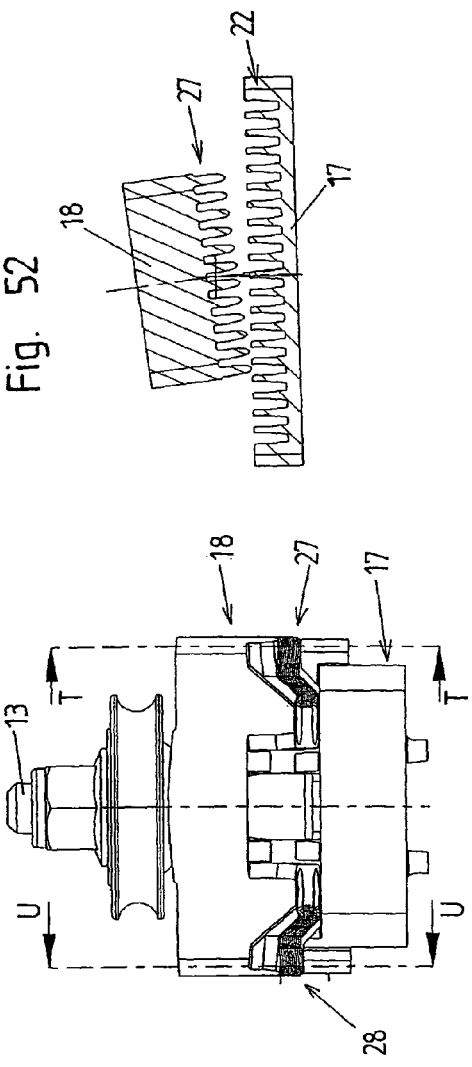
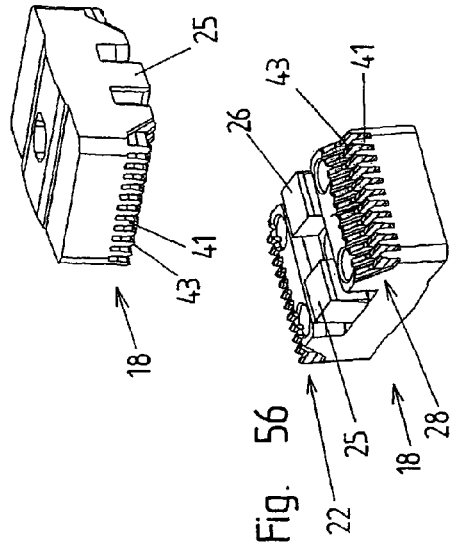
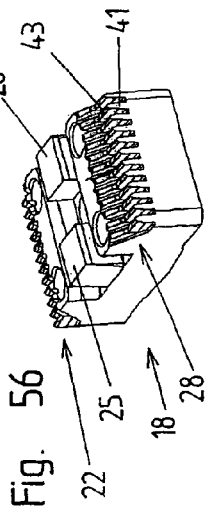
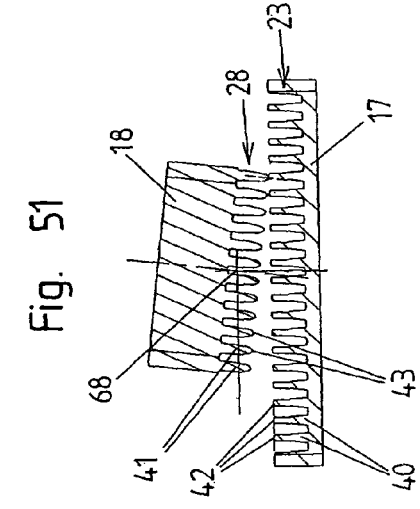
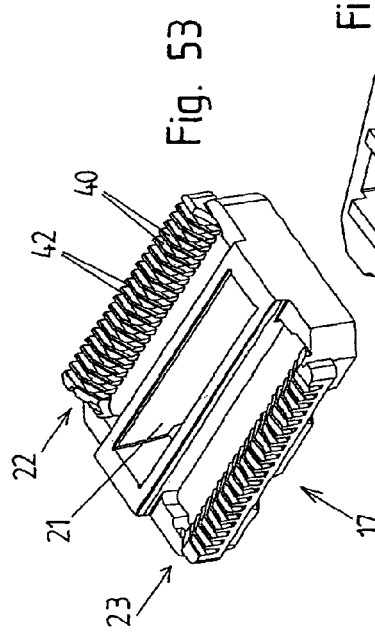

ADJUSTABLE STEERING COLUMN FOR A MOTOR VEHICLE

This is a Rule 1.53(b) Continuation of International Application No. PCT/AT2006/000315, filed Jul. 26, 2006 which is incorporated by reference herein.

BACKGROUND OF THE INVENTION a) Field of the Invention

The invention relates to an adjustable steering column for a motor vehicle with a fixing device, in the opened state of which the steering column is adjustable in at least one displacement direction and in the closed state a set position of the steering column is secured in place. The adjustable steering column comprises at least one securement part, which has at least one toothing with teeth, and at least one counter-securement part, which has at least one counter toothing with teeth, wherein in the closed state of the fixing device teeth of the securement part mesh with teeth of the counter-securement part and during the opening of the fixing device the counter-securement part is withdrawn from the securement part in one opening direction and in the opened state of the fixing device the teeth of the counter-securement part are out of engagement with the teeth of the securement part.

b) Description of Related Prior Art

Adjustable steering columns are known in different embodiments. For adapting to the seating position of the driver, such adjustable steering columns can be adjusted in length (=in the axial direction) and/or in their angular position (=in their inclination), wherein in passenger cars a height adjustment results by adjusting the angular position.

Fixing devices serve to secure in place the set position of the steering column. The fixing devices act through positive locking and/or frictional locking. These fixing devices must, on the one hand, be able to absorb the forces occurring in normal operation in order to maintain the set position of the steering column; on the other hand, in the event of a crash the uncontrolled displacement of the steering column must be prevented in order, for example, for the correct position of an airbag disposed in the steering wheel to be maintained and/or the energy upon the impact of the driver onto the steering wheel to be dissipated under control. Fixing devices acting under frictional locking with disk lamellae cooperating in the manner of a disk lamella pack are disclosed, for example, in EP 0 802 104 B1 or U.S. Pat. No. 6,581,965 B2.

Further known are adjustable steering columns in which the fixing device comprises toothed parts which, in the closed state of the fixing device, engage into one another and consequently block the length displacement and/or the angular displacement of the steering column. Such a steering column is disclosed, for example, in EP 0 836 981 B1, EP 0 755 842 B1, DE 198 39 496 A1, U.S. Pat. No. 5,787,759 A and DE 101 30 587 A1.

Adjustable steering columns have already been proposed in which different action principles are applied in different displacement directions, for example a friction-locking securement of the length displacement and a positive-locking securement of the angular displacement.

To save weight, adjustable steering columns should as much as possible be light-weight, leading to a certain elasticity of the fixing device also. However, the fixing device must have adequate stability in order to fix the set position of the steering column even under high acting forces, such as forces that occur in the event of a crash. In a fixing device acting under frictional locking in one displacement direction herein sufficiently high press-on forces must be applied for the mutual pressing of the friction faces on one another. Due to the oblique tooth flanks in toothings, forces also act in the direction of a distancing of the parts comprising the toothings, which must be absorbed by the fixing device such that the entire construction must be implemented relatively solidly.

In fixing devices acting under positive locking through a tooth engagement of toothings, a problem is encountered that during the closing of the fixing device the tooth combs of the toothings opposing one another can impact upon one another ("tooth-on-tooth" position) wherein the fixing device cannot be closed properly. To decrease this problem, the tooth combs are conventionally formed as acutely as possible, i.e., the side flanks of the teeth which slope toward each other when viewed in cross section are connected with one another in the region of the tooth comb by as small a radius as possible. Furthermore, various devices have already been proposed, by means of which the impacting of the tooth tips during the closing of the fixing device is to be prevented. In the device of DE 198 39 496 A1, which is configured for this purpose, one of the securement parts including the toothings is bearing-supported swivellably about an axis which is at right angles to the displacement direction and at right angles to the opening direction of the two securement parts. In the opened state the swivellably bearing-supported securement part, through swivelling about this transverse axis, is positioned obliquely to the other securement part. Such an implementation is also disclosed in U.S. Pat. No. 5,787,759 A. The teeth of the toothings are here formed in the manner of saw teeth, i.e., one of the side flanks of each tooth is at an angle to the opening direction, the other side flank is parallel to the opening direction (for the swivellably bearing-supported securement part this applies to the closed state of the fixing device).

A further such fixing device with a securement part swivellable about a transverse axis is disclosed in DE 101 30 587 A1, wherein the teeth of the toothings of the securement parts which can be brought into engagement with one another, being again formed in the manner of saw teeth.

PROBLEM ADDRESSED BY THE INVENTION AND SUMMARY OF THE INVENTION

The invention addresses the problem of providing an adjustable steering column of the type described in the introduction, in which, in the closed state of the fixing device, in spite of a light-weight construction of the steering column, high forces can be absorbed without, for the particular displacement direction(s), a displacement of the set position occurring.

This is attained according to the invention in an adjustable steering column of the type described in the introduction, that when viewed in a cross section through the teeth of the securement part and of the counter-securement part, the plane of this cross section being parallel to the displacement direction and parallel to the opening direction, both side flanks of the teeth of the securement part and of the counter-securement part in the closed state of the fixing device, at least in a section of their extent, form angles of inclination of less than 20° with the opening direction.

Due to this implementation of both side flanks of the teeth of the securement part and of the counter-securement part, under a force acting in the direction of the particular displacement direction, such as can occur in particular in the event of a crash, no force component or only a low force component occurs which acts in terms of a pressing-apart of the securement part and of the counter-securement part (parallel to the opening direction). Thereby the security against a slipping-through of the toothings in the event of a crash is increased and/or the fixing device must be formed less solidly.

The tooth engagement between the securement part and the counter-securement part is preferably formed to be self-locking with respect to a force acting in the displacement direction in which the securement part and the counter-securement part fix the displacement. This means the static friction between the cooperating teeth is, under a force acting in the particular displacement direction such as can occur in the event of a crash, at least as large as the force component caused by this force which acts parallel to the opening direction in terms of a distancing of the counter-securement part from the securement part. This force component acting in terms of a distancing can thus be completely absorbed by the frictional force.

Although such self-locking implementation is preferred, the invention also extends to the case that no complete self-locking of the cooperating toothings is provided, but rather only a relatively low force exceeding the static friction is present which acts in terms of a distancing of the counter-securement part from the securement part. In this case it is also still possible to attain a relatively light-weight implementation of the steering column.

The inclination angle of the side flanks of the teeth, starting at which a self-locking against a force acting in the displacement direction occurs, depends on the materials of the teeth and their surface conditions or the presence of lubricants, as will still be described in the description of the Figures.

Known are self-locking implementations of screw threads in order to counteract an unintentional opening of the screw. For example, in coupling disks implementations with teeth which are self-locking against an opening of the coupling disk, for example in the form of trapezoidal teeth, are also known.

In an advantageous embodiment of the invention the at least one securement part comprises at least one first and at least one second toothing, which cooperate with at least a first and at least a second counter toothing of the at least one counter-securement part.

When the first and second toothings and first and second counter toothings are positioned in the form of a V with respect to one another, a lateral play (perpendicular to the displacement direction) can thereby be counteracted.

Because the first and second toothings and first and second counter toothings the counter-securement part or the securement part is swivellable about a rocker axis, which is parallel to the displacement direction, and between the teeth of the first and second toothing or the teeth of the first and second counter toothing an offset is present, the ranges of the setting positions of the steering column in which the fixing device cannot be closed properly due to a "tooth-on-tooth" position of the toothings can be decreased.

The angles of inclination of the side flanks of the teeth of the securement part and of the counter-securement part are preferably less than 12°.

Further advantages and details of the invention will be explained in the following description in conjunction with the attached drawing.

BRIEF DESCRIPTION OF THE DRAWINGS

The drawings depict:

FIG. 1 a steering column according to a first exemplary embodiment of the invention in side view and in the closed state of the fixing device;

FIG. 2 the steering column of FIG. 1 in top view;

FIG. 3 a side view from the opposite side;

FIG. 4 a cross section through the steering column of FIG. 1, section line A-A;

FIG. 6 the securement part and the counter-securement part of the fixing device in the closed state of the fixing device, in elevation (viewing direction B in FIG. 2);

FIG. 7 a section along line C-C of FIG. 6;

FIG. 8 a section along line D-D of FIG. 7;

FIG. 9 a section along line E-E of FIG. 7;

FIG. 10 view from below of the counter-securement part (from the side opposite to that of FIG. 6);

FIGS. 11 & 12 oblique views of the counter-securement part from different viewing directions;

FIGS. 13 & 14 oblique views of the securement part from different viewing directions;

FIG. 22 a section along line F-F of FIG. 19;

FIG. 23 a section along line G-G of FIG. 19;

FIG. 24 a section along line H-H of FIG. 23;

FIGS. 25 & 26 sections along lines I-I and J-J of FIG. 22;

FIGS. 27-30 oblique views from different viewing directions of the two ram parts;

FIGS. 31 & 32 oblique views from different viewing directions of the guidance part;

FIGS. 33 & 34 oblique views from different viewing directions of the actuation part;

FIG. 35 a side view of a steering column according to a third embodiment of the invention;

FIG. 36 a top view onto the steering column of FIG. 35;

FIG. 41 a view of the steering column in the region of the fixing device (viewing direction L of FIG. 36) in the opened state of the fixing device;

FIG. 42 a side view, viewing direction M in FIG. 41;

FIG. 43 a section along line N-N of FIG. 41;

FIG. 44 a section along line O-O of FIG. 42;

FIG. 45 a section along line P-P of FIG. 42;

FIG. 46 a view corresponding to FIG. 41, in the completely closed state of the fixing device;

FIG. 47 a section along line Q-Q of FIG. 46;

FIGS. 48 & 49 sections along lines R-R and S-S of FIG. 47;

FIG. 50 a view corresponding to FIG. 42 in the partially closed state (without springs for distancing the counter-securement part from the securement part);

FIGS. 51 & 52 sections along lines U-U and T-T of FIG. 50;

FIGS. 53 & 54 oblique views of the securement part from different viewing directions;

FIGS. 55 & 56 oblique views of the counter-securement part from different viewing directions;

FIG. 57 a view of a modified embodiment of the counter-securement part.

DETAILED DESCRIPTION OF THE INVENTION

Figure 5:
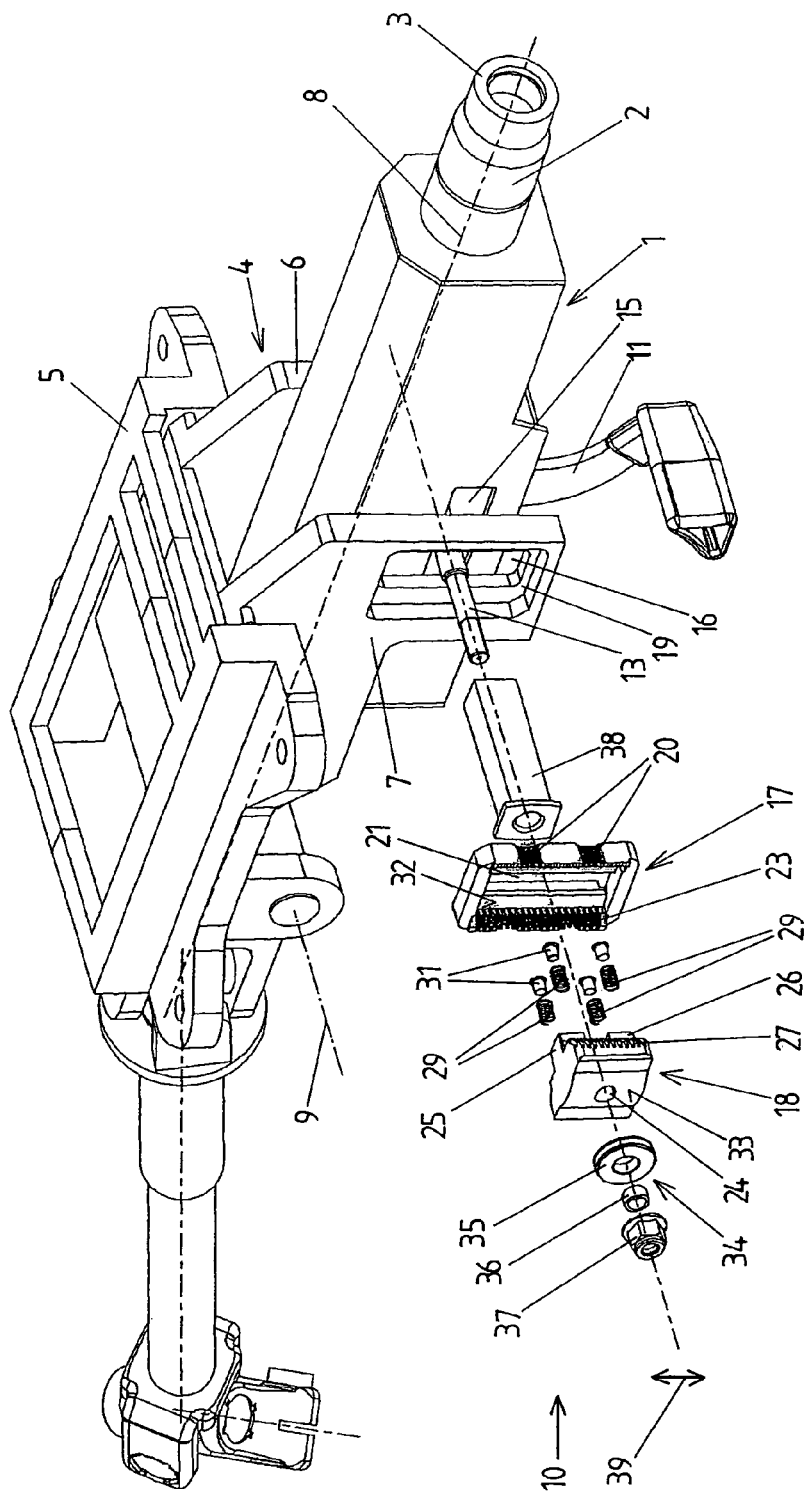
FIG. 5 an oblique view the parts of the fixing device being shown in exploded view.

FIGS. 1 to 14 show a first exemplary embodiment of the invention. The steering column comprises a steering spindle 2 pivotably bearing-supported in a jacket unit, on the end 3 of which a steering wheel (not shown) is to be fastened. The jacket unit 1 is supported by a support unit 4 connected with the chassis of the motor vehicle. For this purpose it is connected with a holding part 5 mounted on the chassis. The connection between the support unit 4 and the holding part 5 is nonmovable in normal operation. In the event of a crash, it can be provided that the support unit 4 dislocates with respect to the holding part 5 with the consumption of energy. Solutions for this purpose are known and are not subject matter of this invention.

The support unit 4 comprises, adjacent the jacket unit 1 (which can also be denoted as jacket tube or guidance box), side jaws 6, 7 extending on both sides, which are in contact on side faces, preferably implemented planarly, of the jacket unit 1 (at least in the closed state of the fixing device). The support unit 4, viewed in cross section, is formed in the shape of a U, the two side jaws 6, 7 forming the parallel legs of the U.

In the exemplary embodiment according to FIGS. 1 to 14 the steering column is adjustable in the longitudinal direction, thus in the direction of the longitudinal axis 8 of the steering spindle, as well as also adjustable in height, thus in its angular position about the swivel axis 9. For the longitudinal displacement, the steering spindle 2 comprises in known manner telescopable sections (not visible in the Figures).

For fixing the set position of the steering column, a fixing device 10 is provided which, in the depicted embodiment, is actuated by an actuation lever 11. By swivelling the actuation lever 11 between an open position and a closed position, a cam disk 12 rigidly connected with the actuation lever 11, which disk is disposed on a fixing bolt (=clamp bolt) 13, is rotated about the longitudinal axis of the fixing bolt 13. The rotatable cam disk 12 cooperates with a connecting link disk 14 which is held torsion-tight (through a twist safety with respect to the side jaw 6, wherein it is shiftable with respect to the side jaw 6 in the displacement direction 39 of the height adjustment).

The fixing bolt 13 penetrates intersecting elongated holes 15, 16 in the jacket unit 1 and in the side jaws 6, 7 of the support unit 4. For example, the elongated holes 16 in the side jaws 6, 7 can be oriented in the direction of the height adjustment of the steering column and the elongated hole 15 in the jacket unit 1 in the direction of the length adjustment of the steering column.

The fixing device 10 further comprises a securement part 17 and a counter-securement part 18. During the opening and closing of the fixing device, these are moved away from or toward one another and specifically in an opening direction 49 or counter to the opening direction 49.

The securement part 17 is secured in place on the side jaw 7 of the support unit 4. For this purpose it is pressed into an indentation 19 of the side jaw 7 in the depicted embodiment. To increase the holding force in the indentation 19, the securement part 17 includes on its outer circumference toothed hollows 20, which are pressed onto corresponding ridges at the edge of the indentation 19, which are not shown in the Figures for the sake of simplicity. Other types of fastening the securement part 17 on the side jaw 7 of support unit 4 are conceivable and feasible, for example by means of welding (in the case of a steel construction). It would further also be conceivable and feasible that the securement part 17 is formed integrally with the side jaw 7, thus is formed by a section of the side jaw 7.

The securement part 17, furthermore, has an opening 21 formed in the shape of an elongated hole, through which penetrates the fixing bolt 13, and which is oriented parallel to the elongated hole 16 in the side jaw 7.

The securement part 17 comprises first and second toothings 22, 23 which will be explained below.

The counter-securement part 18 is disposed on the fixing bolt 13. For this purpose, it includes an opening 24 through which penetrates fixing bolt 13.

Extensions 25, 26 of the counter-securement part 18 project on both sides of the fixing bolt 13 into the opening 21 of the securement part 17 and guide the counter-securement part 18 with respect to the securement part 17.

The counter-securement part 18 includes a first counter toothing 27 and a second counter toothing 28, which will be described in further detail below.

Each of the securement part 17 and the counter-securement part 18 are formed integrally, preferably produced as sintered parts, in the depicted embodiment. Multipart formations are conceivable and feasible, and different materials can be utilized.

Springs 29 server to distance the counter-securement part 18 from the securement part 17 in the opened state of the fixing device 10. The springs 29, in the depicted embodiment, are implemented in the form of helical springs and are received with end sections in pocket holes 30 of the counter-securement part 18. Into their other end sections are inserted guide shoes 31, which rest in contact on glide faces 32 of the securement part 17. The four springs 29 are disposed at the corner points of an imaginary rectangle which encompasses the securement bolt 13.

On a contact face 33 of the counter-securement part 18, which is disposed on the side of the counter-securement part 18 facing away from the securement part 17, rests a contact part 34, which, in the depicted embodiment, is implemented in the form of an axial bearing. It comprises two disks 35 which, through interposed rolling bodies, can be rotated with respect to one another. In the central openings of these disks 35 is located a ring 36, which could also be omitted. On the side opposite the counter-securement part 18 the contact part 34 is stayed on a staying part 37 connected with the fixing bolt 13, which, in the depicted embodiment, is formed by a nut screwed onto an outer thread of the fixing bolt 13.

The contact face 33 of the counter-securement part is convexly arched toward the contact part 34. This convex formation could also be modified to the extent that two faces rising obliquely but planar are provided, which are connected across a radius of greater or lesser size, on which rests the contact part 34.

The guidance sleeve 38, preferably disposed on the fixing bolt 13, having a rectangular outer contour serves for the force transmission and decrease of the play of the fixing bolt with respect to the elongated hole 15 in the jacket unit 1 and the elongated hole 16 in the side jaw 7.

The securement part 17 and the counter-securement part 18 cooperating with it serve for fixing the steering column in the closed state of the fixing device against a displacement of the set position of the steering column in the displacement direction indicated by the double arrow 39, which corresponds to the height adjustment of the steering column. For this purpose the toothings 22, 23 of the securement part cooperate with the counter toothings 27, 28 of the counter-securement part 18.

Toothings 22, 23 and 27, 28 have each a row of teeth 40, 41. These teeth rows extend substantially parallel to the displacement direction 39, (i.e., they deviate from the parallel by less than ±20°), and the combs 42, 43, which are formed by the free ends of teeth 40, 41, extend transversely to the displacement direction 39, preferably substantially at right angles hereto, (i.e., they deviate from the rectangular configuration by less than ±20°.

Between the teeth 40 of the first toothing 22 and the teeth 40 of the second toothing 23 of the securement part there is an offset v with respect to the displacement direction 39, which is preferably one half of the center distance a between successive teeth 40. The center distances a between successive teeth are identical for all teeth 40, 41 of the toothings 22, 23 and counter toothings 27, 28.

Between the teeth 41 of the first and second counter toothings 27, 28, in contrast, there is no such offset.

For example, for the case that at a set position of the height adjustment for teeth 40, 41 of the first toothing 22 and of the first counter toothing 27 currently a "head-on-head" position exists (corresponding to FIG. 9), for the teeth 40, 41 of the second toothing 23 and second counter toothing 28 currently a position exists in which the combs 42, 43 of the one set of teeth 40, 41 are precisely opposite the interspaces (tooth intervals) between the other teeth 41, 40 (corresponding to FIG. 8, wherein, however, the tooth rows are still spaced apart from one another).

If in this displacement position of the height adjustment the fixing device 10 is closed, after a first portion of the closing process the teeth 40, 41 of the first toothing 22 and of the first counter toothing 27 with their combs 42, 43 mutually come to rest in contact on one another. With the further closing of the fixing device the counter-securement part 18 is tilted about an imaginary rocker axis 44, which is parallel to the longitudinal extent of the toothings 22, 23 and counter toothings 27, 28 (and at least substantially parallel to the displacement direction 39). In the process the teeth 40, 41 of the second toothing 23 and of the second counter toothing 28 come into mutual engagement with one another (FIG. 8). In the completely closed state of the fixing device the condition depicted in FIGS. 6 to 9 has been reached. Teeth 40, 41 of the first toothing 22 and of the first counter toothing 27 are herein in contact on one another in a "head-on-head" position, while teeth 40, 41 of the second toothing 23 and of the second counter toothing 28 are completely in engagement with one another. Herein the combs 43 of the one set of teeth 41 abut the bottom lands of the tooth interspaces between the other teeth 40, in the depicted embodiment the combs 43 of teeth 41 of the second counter toothing 28 abut the tooth interspaces between teeth 40 of the second toothing 23. Between the side flanks 45, 46 of teeth 40 and the side flanks 47, 48 of teeth 41 there is herein a minimal play in order to prevent the jamming of the teeth 40, 41.

The imaginary rocker axis 44 also adapts itself through the cooperation of the extensions 25, 26 with the delimitations of opening 21, to which they have a corresponding play. The guidance of extensions 25, 26 in the opening 21 formed as an elongated hole serves further also as twist safety for the counter-securement part 18 with respect to the securement part 17.

To make possible the tilting of the counter-securement part 18, the fixing bolt 13 penetrates through opening 24 in counter-securement part 18 with a corresponding play (with respect to the direction oriented at right angles to the rocker axis 44). Furthermore, as already stated the contact face 33 is arched convexly toward the contact part 34, and specifically about the imaginary rocker axis 44 (or has, as also already stated, obliquely oriented sections).

During the closing of the fixing device 10, teeth 40, 41 of toothings 22, 23 and counter toothings 27, 28 can assume different positions toward one another depending on the position of the steering column set with respect to the displacement direction 39. Previously a setting has been described in which the combs 43 of teeth 41 of the second counter toothing 28 are oriented centrally opposite to the tooth interspaces between teeth 40 of the second toothing 23 (and conversely the combs 42 of teeth 40 of the second toothing 23 to the tooth interspaces of teeth 41 of the second counter toothing 28). If the counter-securement part 18 has shifted into the displacement direction 39, in comparison about a small fraction of the distance a between two teeth 40, 41, such that during the closing of the fixing device 10 a section of one of the side flanks 47, 48 of teeth 41 of the second counter toothing 28 still comes into contact with the corresponding side flank 45, 46 of teeth 40 of the second toothing, or at least transition regions between combs 42, 43 and side flanks 45, 46, 47, 48 come into mutual contact with one another, thus during the closing of the fixing device the counter-securement part 18 is shifted about this fraction with respect to the securement part, such that in the closed state, again, the situation depicted in FIGS. 6 to 9 has been reached. If the set position between the counter-securement part 18 and the securement part 17 is shifted, compared to the previously described situation, about half a tooth distance a, thus in the closed state a "head-on-head" position of the teeth 41, 40 of the second counter toothing 28 and of the second toothing 23 occurs and the engagement of teeth 41, 40 of the first counter toothing 27 and the first toothing 22 occurs.

Nevertheless, intermediate positions can occur in which, while they extend only over relatively small regions of the mutual positioning of the counter-securement part 18 and securement part 17, a proper closing of the fixing device 10 is not possible due to a "head-on-head" position of teeth 40, 41 of both toothings 22, 23 and counter toothings 27, 28. The set position on the steering wheel must in this case be minimally changed for the closing of the fixing device 10.

Instead of the described offset of teeth 40 of the first and second toothings 22, 23, or in addition hereto, the teeth 41 of the first and second counter toothings 27, 28 can also have such offset.

Viewed in cross section through the tooth rows, formed by the toothings 22, 23 and counter toothings 27, 28, of securement part 17 and counter-securement part 18, wherein the plane of this cross section is oriented parallel to the opening direction 49 and at right angles to the displacement direction 39 (cf. FIG. 7), the free ends or combs 42 of teeth 40 of the first toothing 22 and of the second toothing 23 are positioned in the form of a V with respect to one another and the combs 43 of teeth 41 of the first counter toothing 27 and of the second counter toothing 28 are also positioned in the form of a V with respect to one another, and specifically at the same angle. In the closed state of the fixing device 10 a dislocation of the counter-securement part 18 with respect to the securement part 17 into a direction at right angles to the displacement direction 39 is thereby prevented under positive locking.

Viewed in a cross section through teeth 40, 41 of the securement part 17 and counter-securement part 18, in which the plane of this cross section is oriented parallel to the displacement direction 39 and parallel to the opening direction 49 (cf. FIGS. 8 and 9), both side flanks 45, 46 of teeth 40 and both side flanks 47, 48 of teeth 41, with the exception of in the transition regions to the combs 42, 43 or to the bottoms 50, 51 of the tooth interspaces, have inclination angles of less than 20°, preferably less than 12°, to the opening direction 49. This is the case at least for a section of the particular extent of the side flanks 45, 46, 47, 48, wherein this section of the extent of the particular side flank 45, 46, 47, 48 extends preferably over a major portion, i.e. at least more than 50%, of height h1, h2 of teeth 40, 41.

The side flanks 45 to 48 are herein preferably not oriented parallel to the opening direction 49, in order to facilitate the mutual engagement of the counter-securement part 18 with the securement part 17 (in order to make possible the proper closing of the fixing device over larger regions of the positioning of the steering column).

The inclination angles 52 of the side flanks 45 to 48 are preferably in a range which leads to a self-locking of the tooth engagement between the teeth 40, 41 at a force acting in the displacement direction 39, in which the teeth 40, 41 block the adjustment of the steering column. The maximum inclination angles 52, up to which there is such self-locking tooth engagement, depend herein in particular on the pairing of the materials and on the presence or absence of the lubrication of the surfaces.

In an advantageous embodiment of the invention, the teeth 40, 41 are comprised of sinter metal or steel and are not lubricated. The maximum inclination angle 52, up to which a self-locking occurs, is in this case in the range from 8 to 10.5°.

If the teeth 40, 41 are comprised of an aluminum alloy (and are not lubricated), the maximum inclination angle 52, up to which self-locking occurs, is in the range between 11 and 15°.

If the inclination angle 52 is slightly greater than the maximum inclination angle up to which self-locking occurs, at a closed state of the fixing device 10 in which teeth 40, 41 are in engagement, in the event of a force acting in the displacement direction, a force component in the opening direction 49 exceeding the static friction occurs, such that overall a force acting in the opening direction 49 occurs. This construction is thereby implemented with an appropriate stability, such that forces up to a certain magnitude can be absorbed without bringing the teeth 40, 41 out of engagement. The steering column can herein be implemented the lighter-weight the lower this force acting in the opening direction 49 is for a given maximum value of the force acting in the displacement direction 39.

The inclination angles 52 of side flanks 45 to 48 of teeth 40, 41 preferably, at least in a section of their extent which advantageously extends over a major portion of heights h1, h2 of teeth 40, 41, are greater by less than 5° than the maximum inclination angle 52 for which a self-locking occurs at the given material pairing, surface condition and lubrication of teeth 40, 41.

The maximum inclination angle, up to which self-locking occurs, is calculated thereby that at a force acting in the displacement direction 39, the force component which acts in terms of a mutual slipping of the side flanks of teeth 40, 41, is equated with the static friction force. The static friction force R is given by $\mu Q$, where Q is the normal force acting at right angles onto the friction face and $\mu$ the coefficient of friction. The maximum inclination angle 52 up to which a self-locking occurs, is consequently given by $\tan \alpha = \mu$, wherein $\alpha$ is the inclination angle 52.

It would also be conceivable and feasible to bearing-support the securement part 17, instead of the counter-securement part 18, swivellably about rocker axis 44.

Figure 16:
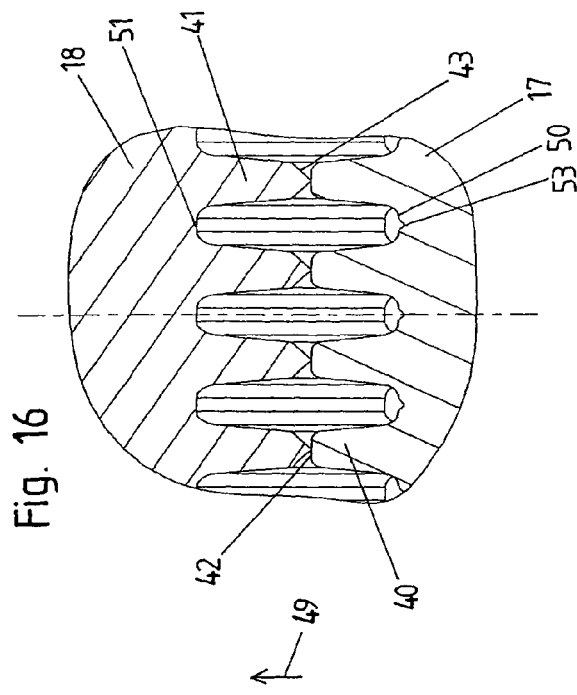
FIGS. 15 & 16 sectional representations corresponding to FIG. 8 and FIG. 9 of a modified implementation of the toothings.
Figure 15:
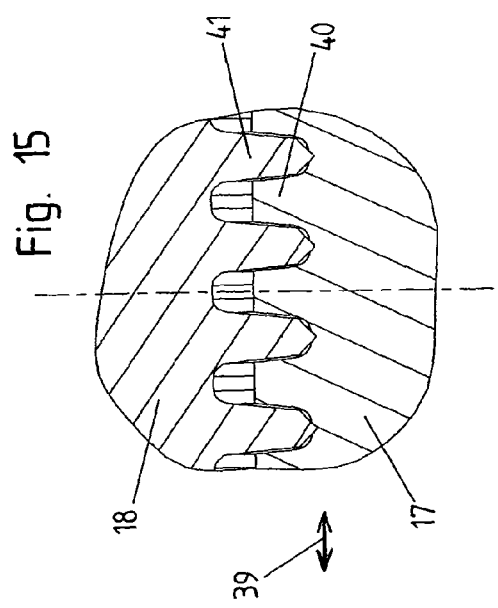

FIGS. 15 and 16, as well as 17 and 18, depict two modified embodiments of the teeth 41 and the bottoms 50 of the tooth interspaces between teeth 40 in order to attain absence of play in the displacement direction 39 (in spite of the play between the side flanks 45, 46 and 47, 48). In the embodiment according to FIGS. 15 and 16 the one set of teeth, for example teeth 41, in the region of their combs 43, viewed in cross section parallel to the displacement direction 39 and parallel to the opening direction 49, are formed in the shape of a wedge and in the bottoms of the tooth interspaces between the other teeth, for example in the bottoms 50 of the tooth interspaces between teeth 40, viewed in cross section through the teeth, corresponding V-shaped indentations 53 are provided, which receive the wedges at the complete engagement of teeth 40, 41.

The wedge forms of the combs 43 are preferably, as shown, blunt, i.e., the opening angle of the wedge forms is greater than 45°, preferably greater than 60°. The indentations 53 receiving the wedge-shaped combs 43 can also only be formed in the shape of a V in sections and, for example, include dirt pockets at their lowest sites.

Figure 18:
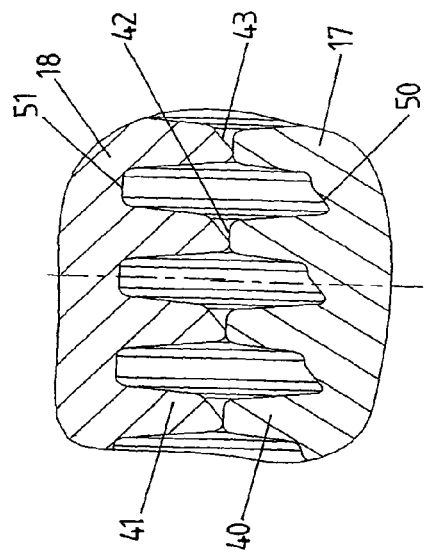
FIGS. 17 & 18 sectional representations corresponding to FIGS. 8 and 9 of a further modified implementation of the toothings.
Figure 17:
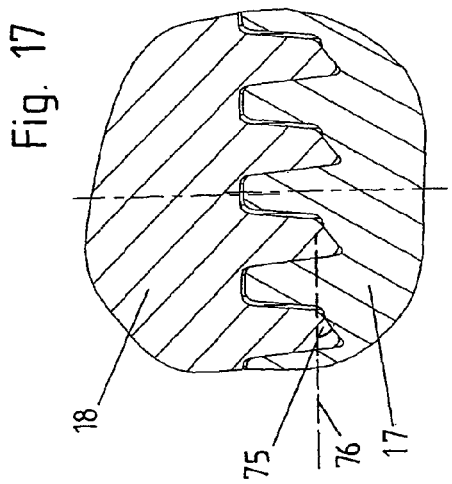
Figure 20:
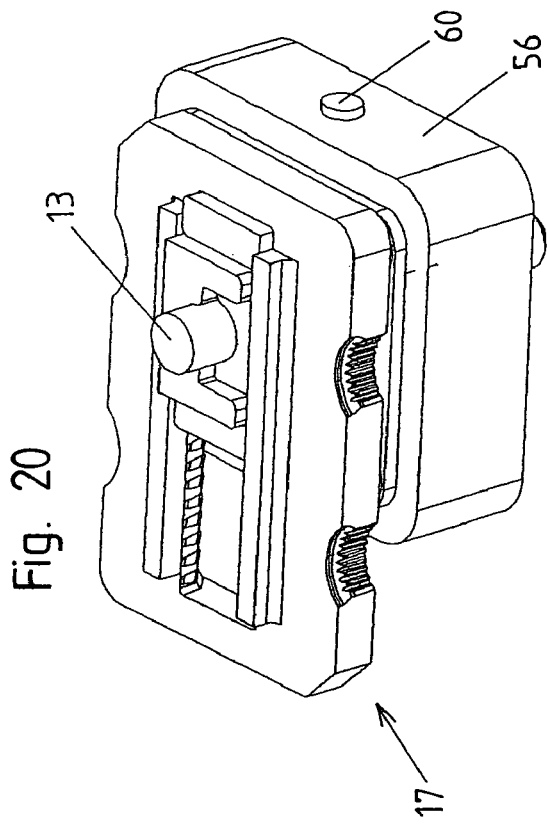
FIGS. 20 & 21 oblique views from different viewing directions of the component of the fixing device of FIG. 19.
Figure 21:
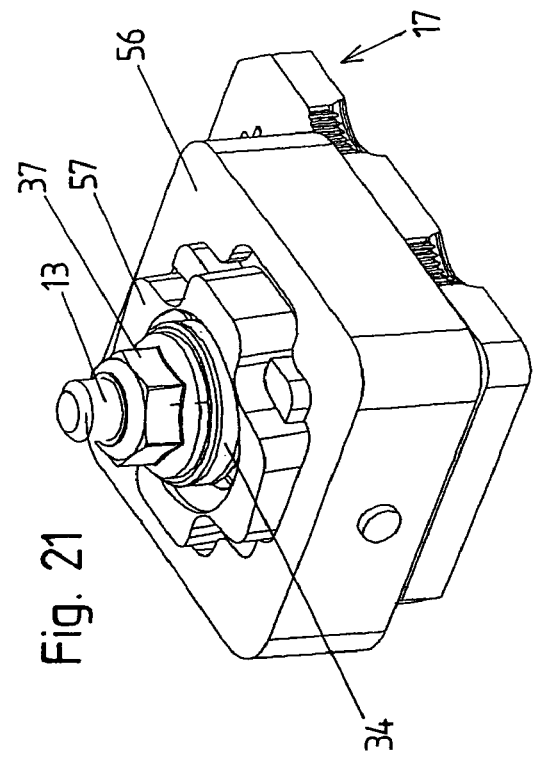
Figure 19:
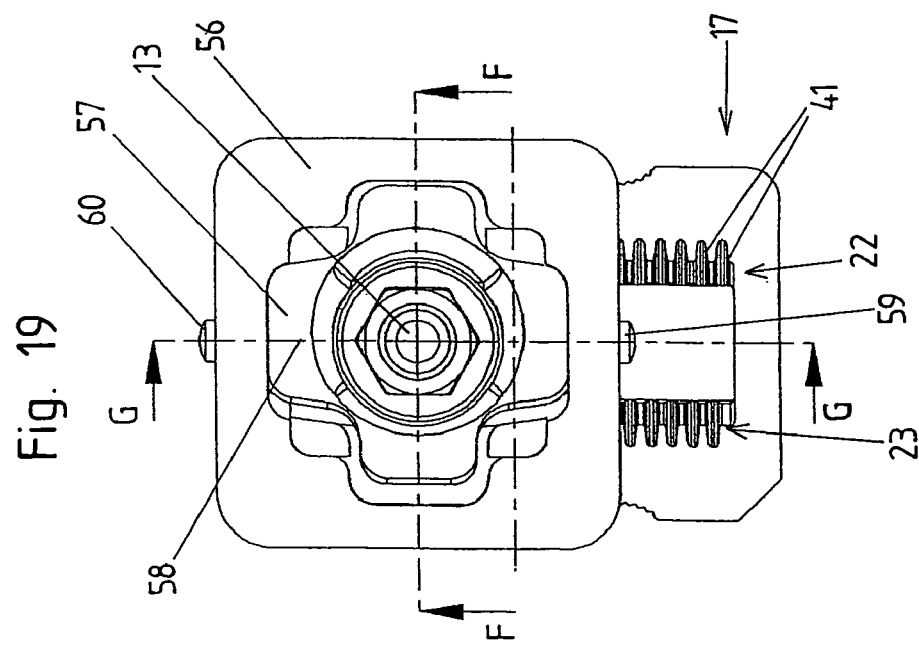
FIG. 19 a component of a fixing device according to a second embodiment of the invention, in an elevation corresponding to FIG. 6.
Figure 37:
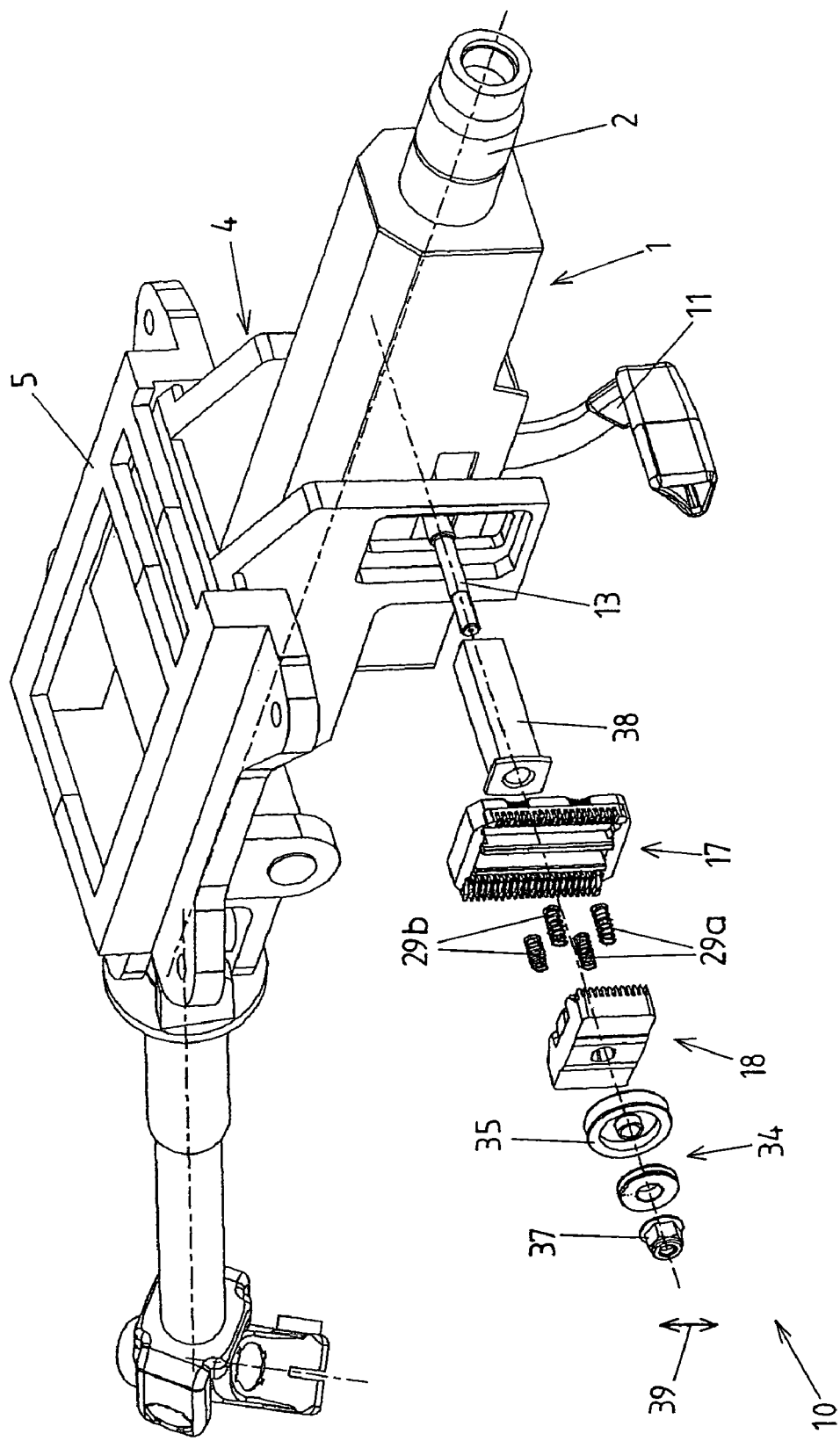
FIG. 37 an oblique view of the steering column, parts of the securement [sic: fixing] device pulled apart in exploded view (in the oblique view the side opposite to the side shown in FIG. 35 is visible)
Figure 40:
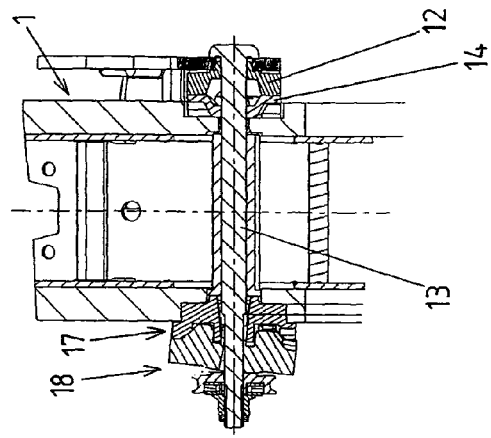
FIGS. 39 & 40 sections along line K-K of FIG. 35 in the opened and in the closed state of the fixing device.
Figure 39:
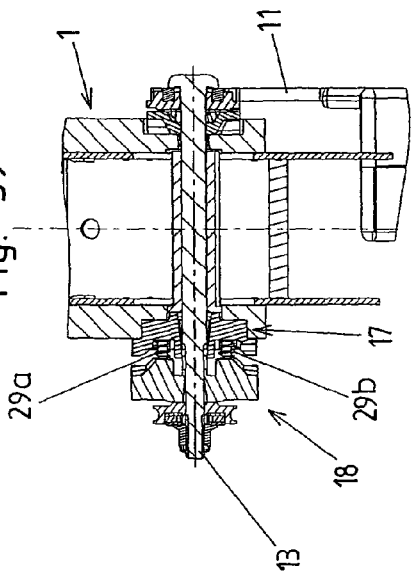
Figure 38:
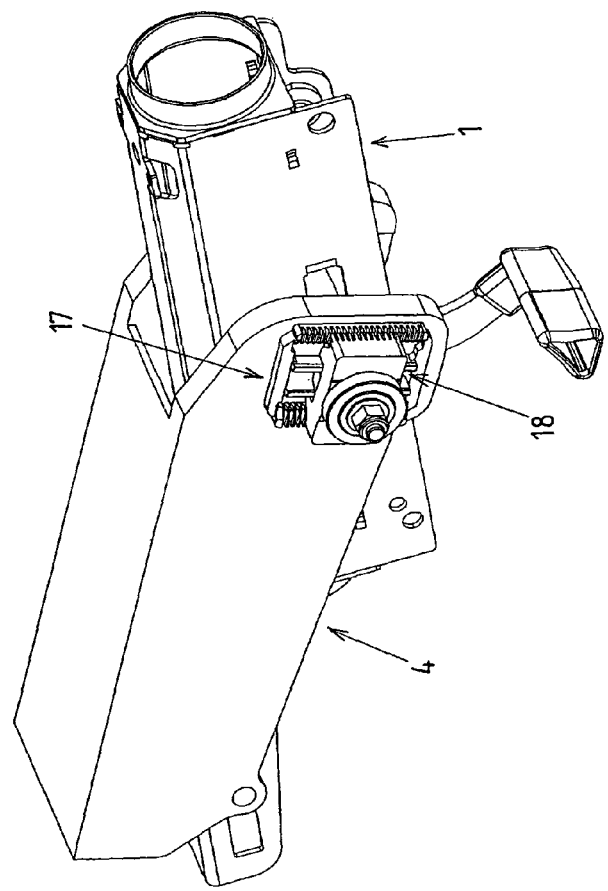
FIG. 38 an oblique view of a component of the steering column and [sic: of] FIG. 35, in the opened state of the fixing device.

In the embodiment according to FIGS. 17 and 18 the one set of teeth, for example teeth 41, viewed in a cross section parallel to the displacement direction 39 and parallel to the opening direction 49, in the region of their free ends or combs 43 comprise slopes which are received by, viewed in cross section through the teeth, sloped bottoms 50 of the tooth interspaces between the other teeth, for example teeth 40, in the complete engagement of teeth 40, 41. The slopes of the combs 43 or bottoms 50 have preferably, with respect to a plane 75 oriented at right angles to the opening direction 49, inclination angles 76 which are smaller than 60°, preferably smaller than 45°.

In the embodiments of FIGS. 15 to 18, only a portion of teeth 41 could have such wedge forms or slopes which cooperate with V-shaped indentations 53 or sloped bottoms 50. The wedge forms or slopes can be disposed at the combs of teeth 40, 41 of the securement part and/or of the counter-securement part.

Due to the play between the side flanks 45, 46 and 47, 48 at least on one side of a particular tooth 40, 41, in spite of the small inclination angle a wedge-jamming of the teeth 40, 41 during the closing of the fixing device is avoided, which would hinder the opening of the fixing device. Nevertheless, freedom from play is ensured in normal operation. If large forces occur, such as in the event of a crash, these can be absorbed by the cooperating side flanks of the teeth (optionally after overcoming the play between them).

In a second embodiment of the invention, the fixing device 10 is modified such as is shown in FIGS. 19 to 34. Apart from the changes described in the following, the steering column according to this embodiment corresponds to the steering column previously described in conjunction with FIGS. 1 to 14.

The counter-securement part 18 cooperating with the securement part 17 in this embodiment is formed of two parts and has a first and a second ram part 54, 55. On the ram part 54 is disposed the first counter toothing 27 and on the second ram part 55 the second counter toothing 28. The ram parts are supported in a cage-like guidance part 56 such that they are displaceable in the opening direction 49. Swivel bolts 59, 60 (cf. for example FIG. 23) secured in place in bores in the actuation part 57 project into bearing bores in the guidance part 56.

A convex contact face 61, facing away from counter-securement part 18, of the actuation part 57 cooperates with a contact part 34 again formed as axial bearing, which contact part is shifted in the axial direction of the fixing bolt 13 during the opening and closing of the fixing device 10.

Between the guidance part 56 and the ram parts 54, 55 are disposed springs 66, 67 which, in the opened state of the fixing device, hold the ram parts 54, 55 at equal distances from the securement part 17 and the actuation part 57 in its unswivelled center position. Further, helical springs (not shown in FIGS. 19 to 34) acting between the guidance part 56 and the securement part 17 project into pocket hole bores 69 of the guidance part 56 and stay it on the securement part 17.

The securement part 17 with its toothings 22, 23 and the counter toothings 27, 28 on the ram parts 54, 55 of the counter-securement part 18 are implemented in the manner previously described. During the closing of the fixing device 10, the contact part 34 is pressed onto the actuation part 57. When the teeth 41 of one of the two counter toothings 27, 28 of ram parts 54, 55 can come into engagement with the teeth 40 of one of the toothings 22, 23, the actuation part 57 swivels about the swivel axis 58, in order to shift the corresponding ram part 54, 55 counter to the opening direction 49 and to bring its teeth 41 into engagement with teeth 40. For the teeth 41 of the other ram part 54, 55, in contrast, there is a "tooth-on-tooth" position on the opposing teeth 40 of the securement part 17.

Extensions 62 to 65 of ram parts 54, 55 serve for guiding the ram parts 54, 55 on the edges of the opening 21 in the securement part 17, whereby the twist safety of the counter-securement part 18 and a low play with respect to the securement part 17 is attained. The fixing bolt 13 is received by the trough-form recesses on the side of the ram parts 54, 55 facing each other.

A further exemplary embodiment of the invention is depicted in FIGS. 35 to 56. Apart from the changes described in the following, the steering column according to this embodiment is implemented corresponding to the embodiment already described in conjunction with FIGS. 1 to 14.

The essential difference from the embodiment of FIGS. 1 to 14 is that the counter-securement part 18 during the closing of the fixing device 10 swivels additionally about a transverse axis 68 which is oriented at right angles to the displacement direction 39 and at right angles to the opening direction 49. In the opened state of the fixing device 10, which is depicted in FIGS. 41 to 45, the counter-securement part 18 is swivelled with respect to securement part 17 about the transverse axis 68 into an oblique position. The imaginary lines 71, 72, which, viewed in cross section through the teeth (corresponding to FIG. 45) connect the free ends of teeth 40, 41 of toothings 22, 23 or the counter toothings 27, 28, consequently form an angle with one another. In the depicted embodiment this oblique position is attained thereby that the springs 29 between the securement part 17 and the counter-securement part 18 are of different lengths. The two springs 29a, which, with respect to the displacement direction 39, are disposed on the one side of the fixing bolt 13, are longer than the other two springs 29b. This function can also be fulfilled by an appropriately formed flat spring with spring arms.

Combs 42 of teeth 40 of the first toothing 22 and of the second toothing 23 in this embodiment comprise snap-in sections 73 positioned in the form of a V, and on both sides, these V-form snap-in sections 73 are adjoined by seeking sections 70, in which are located the combs 42 of teeth 40 of the first toothing 22 and of the second toothing 23 in the same plane (cf. for example FIGS. 41 and 42). The counter toothings 27, 28 are formed in corresponding manner.

If during the closing of the fixing device the free ends or combs 43 of the teeth 41, for example of the first counter toothing 27, impact on the combs 42 of the teeth 40 of the first toothing 22, as is shown in FIG. 51, with the further closing of the fixing device, swivelling occurs of the counter-securement part 18 about the transverse axis 68 until in the closed state a position is reached parallel with respect to the cross section through the teeth 40, 41, of the counter-securement part 18 to the securement part 17 (cf. FIGS. 46 to 49).

Simultaneously, during the further closing, starting from the state shown in FIGS. 50 to 52, a swivelling of the counter-securement part 18 about the rocker axis 44 (cf. FIGS. 46 and 47) occurs, as has already been explained in the embodiment according to FIGS. 1 to 14.

If such a setting with respect to the displacement direction 39 is present that during the closing of the fixing device in both toothings 22, 23 and counter toothings 27, 28 there are initially "head-on-head" positions, with the further closing of the fixing device through the swivelling of the counter-securement part 18 about the transverse axis 68, this "head-on-head" position is cancelled out either for the first toothing 22 and first counter toothing 27 or for the second toothing 23 and second counter toothing 28, whereupon during the further closing of the fixing a tooth engagement between these teeth 40, 41 of the corresponding toothing 22, 23 and counter toothing 27, 28 occurs. Herein, again a swivelling of the counter-securement part about the rocker axis 44 occurs.

While bringing teeth 40, 41 into engagement, the seeking sections 70 initially engage into one another and, subsequently, the snap-in sections 73.

The fixing device 10 can thereby be closed in any displacement position of the counter-securement part 18 with respect to the securement part 17 with reference to the displacement direction 39, wherein, possibly, a slight shifting occurs of the counter-securement part 18 with respect to the securement part 17 in the displacement direction 39.

The snap-in sections of teeth 40, 41 are formed identically to those described in the embodiment in conjunction with FIGS. 1 to 14; the inclination angles of the counter toothings here relate to the closed state of the fixing device, in which the swivelling of the counter-securement part 18 about the transverse axis 68 is cancelled out.

The seeking sections 70 can be formed with the same inclinations of the side flanks, wherein preferably the interspaces between the teeth 40, 41 in these seeking sections 70 are slightly greater than in the snap-in sections 73, such that in the engagement of the snap-in sections 73 the seeking sections 70 have a slight mutual play.

It would also be conceivable and feasible, instead of the counter-securement part 18, to implement the securement part 17 such that it is swivellable about the transverse axis 68, such that this securement part in the opened state of the fixing device is tilted about the transverse axis 68.

The contact part 34 is implemented in two parts and comprises an axial bearing and a disk 35 with a groove disposed on the periphery. Into this groove a weight compensation spring can engage for holding the weight of the steering column in the opened state of the fixing device (not shown in the Figures).

In the depicted embodiment, fixing in the direction of the longitudinal adjustment of the steering column takes place under frictional locking. In the closed state of the fixing device 10 the side jaws 6, 7 are pressed onto the side faces of the jacket unit 1, whereby the longitudinal adjustment of the steering column is fixed under frictional locking.

For fixing the longitudinal adjustment of the steering column, several friction faces disposed on lamellae cooperating in the manner of a lamella disk coupling can also be provided. Fixing under positive locking via cooperating toothings is also conceivable and feasible.

In the depicted embodiment only one securement part and one counter-securement part are provided on one side of the jacket unit 1. Instead, for fixing the angular adjustment or height adjustment of the steering column, also cooperating securement parts and counter-securement parts according to the invention can be provided on both sides of the jacket unit.

The invention has been described in connection with fixing the angular adjustment or height adjustment of a steering column. In the manner according to the invention, instead, the length adjustment of the steering column could also be fixed. The angular or height adjustment as well as also the length adjustment of the steering column can be fixed in the manner according to the invention. It can herein also be provided that the fixing bolt 13 does not penetrate the steering column completely, but rather only projects into the jacket unit 1, wherein the securement part and the counter-securement part for fixing the length adjustment are located within the jacket unit 1. Herein an additional guidance unit could be provided between the jacket unit 1 and the support unit 4, which guides the jacket unit in the longitudinal direction of the steering spindle such that it is displaceable and which, with respect to the support unit, is swivellable about the swivel axis for the angular or height adjustment. Such constructions are known, for example within prior art cited in the introduction to the specification.

Various further modifications of the depicted embodiment are conceivable and feasible without leaving the scope of the invention. For example, in the described embodiment the fixing device is closed by swivelling an actuation lever, wherein a cam disk 12 cooperates with a connecting link disk 14. Also other manual actuation devices can be provided in order to make available for the closing of the fixing device a force acting counter to the opening direction 49 onto the counter-securement part 18. Actuation by motor of the fixing device is also conceivable and feasible.

Although an at least section-wise V position of the toothings 22, 23 and counter toothings 27, 28 is preferred, these could also be oriented parallel to one another.

It would also be conceivable and feasible that the securement part 17 comprises only one toothing and the counter-securement part 18 only one counter toothing cooperating with the toothing of the securement part. One advantage of a formation in the manner of a rocker comprises that the axial displacement path of the fixing bolt 13 is less than with a straight-line displacement of the counter-securement part 18.

It is furthermore advantageous to provide a spring device which acts between the securement part and the counter-securement part in order to press the extensions 25, 26 of the counter-securement part onto a side edge of the opening 21 in the securement part 17 (in the direction at right angles to the displacement direction 39), in order to maintain a precise parallel position of teeth 40 and 41. The implementation of a counter-securement part with such a clamping spring 74 is depicted in FIG. 57. The clamping spring 74 is disposed in a recess of an extension 26 and laterally projects over it for the contact on the securement part 17.

LEGEND TO THE REFERENCE NUMBERS

1 Jacket unit
2 Steering spindle
3 End
4 Support unit
5 Holding part
6 Side jaw
7 Side jaw
8 Longitudinal axis
9 Swivel axis
10 Fixing device
11 Actuation lever
123 Cam disk
13 Fixing bolt
14 Connecting link disk
15 Elongated hole
16 Elongated hole
17 Securement part
18 Counter-securement part
19 Indentation
20 Trough
21 Opening
22 First toothing
23 Second toothing
24 Opening
25 Extension
26 Extension
27 First counter toothing
28 Second counter toothing
29 Spring
30 Pocket hole
31 Glide shoe
32 Glide face
33 Contact face
34 Contact part
35 Disk
36 Ring
37 Brace part
38 Guidance sleeve
39 Displacement direction
40 Tooth
41 Tooth
42 Comb
43 Comb
44 Rocker axis
45 Side flank
46 Side flank
47 Side flank
48 Side flank
49 Opening direction
50 Bottom
51 Bottom
52 Inclination angle
53 Indentation
54 Ram part
55 Ram part
56 Guidance part
57 Actuation part
58 Swivel axis
59 Swivel bolt
60 Swivel bolt
61 Contact face
62 Extension
63 Extension
64 Extension
65 Extension
66 Extension
67 Spring
68 Spring
69 Transverse axis
70 Pocket hole bore
71 Seeking section
72 Line
73 Line
74 Snap-in section
75 Clamp spring
76 Plane
77 Inclination angle

I claim:

1. An adjustable steering column for a motor vehicle, the steering column comprising:
    a fixing device having an opened state in which the steering column is adjustable in a displacement direction and a closed state in which the steering column is fixed in a set position,
    wherein the fixing device comprises at least one securement part and at least one counter-securement part, the at least one securement part including at least one toothing with teeth and the at least one counter-securement part including at least one counter toothing with teeth, wherein each of the teeth of the at least one securement part and the at least one counter-securement part have side flanks;
    wherein the teeth of the at least one securement part are engaged with the teeth of the at least one counter-securement part in the closed state of the fixing device, and the teeth of the at least one counter-securement part are out of engagement with the teeth of the at least one securement part in the opened state of the fixing device,
    wherein the fixing device is configured such that the at least one counter-securement part is withdrawn from the at least one securement part in an opening direction to open the fixing device, and
    wherein, in the closed state of the fixing device, at least a portion of both side flanks of the teeth of each of the at least one securement part and the at least one counter-securement part form an inclination angle of less than 20° with respect to a plane that is parallel to the opening direction and perpendicular to the displacement direction.

2. The adjustable steering column of claim 1, wherein the inclination angles of the portion of side flanks of the teeth of the at least one securement part and the at least one counter-securement part are less than 12°.

3. The adjustable steering column of claim 1, wherein the portion of the side flanks of each of the teeth extends over a majority of the height of the tooth.

4. The adjustable steering column of claim 1, wherein the inclination angles of the side flanks of the teeth are less than 5° over a maximum inclination angle up to which the tooth engagement between the at least one securement part and the at least one counter-securement part is self-locking against a force acting in the displacement direction.

5. The adjustable steering column of claim 1, wherein the teeth of the at least one securement part and the at least one counter-securement part are configured such that the tooth engagement between the at least one securement part and the at least one counter-securement part is self-locking against a force acting in the displacement direction.

6. The adjustable steering column of claim 1, wherein at least some of the teeth of the at least one securement part or of the at least one counter-securement part have wedge forms,
    wherein V-shaped indentations are formed in tooth interspaces on the at least one securement part or the at least one counter-securement part, and
    wherein the wedge forms project into the V-shaped indentations in the closed state of the fixing device.

7. The adjustable steering column of claim 1, wherein at least some of the teeth of the at least one securement part or of the at least one counter-securement part have a sloped portion on the free ends thereof,
    wherein sloped bottoms are formed in tooth interspaces on the at least one securement part or the at least one counter-securement part, and
    wherein the sloped portions contact the sloped bottoms in the closed state of the fixing device.

8. The adjustable steering column of claim 1, wherein the at least one securement part comprises at least one first toothing and at least one second toothing which cooperate with a first counter toothing and a second counter toothing, respectively, of the at least one counter-securement part.

9. The adjustable steering column of claim 8, wherein the first toothing and the second toothing are angled with respect to a plane that is perpendicular to the opening direction and parallel to the displacement direction such that the first toothing and the second toothing form a V with respect to one another,
    wherein the first counter toothing and the second counter toothing are angled with respect to a plane that is perpendicular to the opening direction and parallel to the displacement direction such that the first counter toothing and the second counter toothing form a V with respect to one another, and
    wherein the angle between the first toothing and the second toothing is identical to the angle between the first counter toothing and the second counter toothing.

10. The adjustable steering column of claim 8, wherein the fixing device includes an offset between the teeth of the first toothing and the teeth of the second toothing or between the teeth of the first counter toothing and the teeth of the second counter toothing, the offset being equal to a fraction of the distance between the centers of successive teeth.

11. The adjustable steering column of claim 10, wherein the offset is one half the distance between the centers of successive teeth.

12. The adjustable steering column of claim 10, wherein the at least one counter-securement part or the at least one securement part is swivellable about a rocker axis, the rocker axis being parallel to the displacement direction, and
    wherein during the closing of the fixing device the at least one counter-securement part and the at least one securement part come into tooth engagement either between the teeth of the first toothing with the teeth of the first counter toothing or between the teeth of the second toothing with the teeth of the second counter toothing swivelled about the rocker axis.

13. The adjustable steering column of claim 10, wherein the at least one counter-securement part comprises first and second ram parts, wherein the first counter toothing is disposed on the first ram part and the second counter toothing is disposed on the second ram part, and the ram parts during the closing of the fixing device are independently shiftable counter to the opening direction.

14. The adjustable steering column of claim 13, further comprising:
    a guidance part; and
    an actuating part,
    wherein the ram parts are shiftably supported in the guidance part,
    wherein the actuation part is swivellable relative to the guidance part and cooperates with the ram parts for shifting the ram parts counter to the opening direction in closing the fixing device.

15. The adjustable steering column of claim 1, wherein the at least one counter-securement part or the at least one securement part is swivellable about a transverse axis which is perpendicular to the displacement direction and perpendicular to the opening direction, and wherein the at least one counter-securement part or the at least one securement part are swivellable about the transverse axis into an oblique position in the opened state of the fixing device.

16. The adjustable steering column of claim 15, wherein springs disposed between the at least one securement part and the at least one counter-securement part distance the at least one securement part and the at least one counter-securement part from one another in the opened state of the fixing device,
wherein the springs swivel the at least one counter-securement part with respect to the at least one securement part about the transverse axis into the oblique position, and
wherein the springs are helical springs of different lengths.

17. The adjustable steering column of claim 15, wherein the first and second toothings and the first and second counter toothings comprise snap-in sections on both sides thereof, the snap-in sections being positioned in the shape of a V with respect to one another, and lateral seeking sections located parallel and in the same plane.

18. The adjustable steering column of claim 1, wherein the fixing device comprises a fixing bolt which penetrates the at least one securement part and the at least one counter-securement part through openings.

19. The adjustable steering column of claim 18, wherein a contact part is disposed on the fixing bolt for coming in contact on a contact face of the at least one counter-securement part, the contact face facing away from the at least one securement part, and
wherein the at least one counter-securement part in the closed state of the fixing device is pressed onto the at least one securement part by the contact part.

20. The adjustable steering column of claim 19, wherein the contact part is an axial bearing.

21. The adjustable steering column of claim 19, wherein the contact face of the at least one counter-securement part is arched convexly toward the contact part or includes oblique faces which are connected with one another through a vertex or a bent region, on which the contact part is in contact.

22. The adjustable steering column of claim 1, wherein the inclination angles of the side flanks of the teeth of the at least one securement part and the at least one counter-securement part are greater than 3°.

23. The adjustable steering column of claim 1, further comprising:
a spring device for the parallel positioning of the teeth of the at least one securement part and the at least one counter-securement part, the spring device acting between the securement part and the at least one counter-securement part and shifting the counter-securement part with respect to the at least one securement part up to a mutual stop in a direction perpendicular to the displacement direction.

* * * * *